(12) United States Patent
Dudding

(10) Patent No.: US 9,649,673 B2
(45) Date of Patent: May 16, 2017

(54) SYSTEM AND METHOD FOR STRENGTHENING A SLOPED STRUCTURE SUCH AS A BERM, BASIN, LEVEE, EMBANKMENT, OR THE LIKE

(71) Applicant: AWT IP, LLC, Glen Allen, VA (US)

(72) Inventor: Carlton Dudding, Glen Allen, VA (US)

(73) Assignee: AWT IP LLC, Glen Allen, VA (US)

( * ) Notice: Subject to any disclaimer, the term of this patent is extended or adjusted under 35 U.S.C. 154(b) by 0 days.

(21) Appl. No.: 14/592,577

(22) Filed: Jan. 8, 2015

(65) Prior Publication Data

US 2015/0125214 A1     May 7, 2015

Related U.S. Application Data

(60) Division of application No. 13/447,625, filed on Apr. 16, 2012, now Pat. No. 8,961,073, which is a
(Continued)

(51) Int. Cl.
| | |
|---|---|
| *B09B 1/00* | (2006.01) |
| *E02D 17/18* | (2006.01) |
| *E02D 17/20* | (2006.01) |
| *E02D 31/02* | (2006.01) |
| *E02D 29/02* | (2006.01) |

(Continued)

(52) U.S. Cl.
CPC ............ *B09B 1/004* (2013.01); *B09B 1/00* (2013.01); *B09B 1/008* (2013.01); *E02B 11/00* (2013.01); *E02D 17/18* (2013.01); *E02D 17/202* (2013.01); *E02D 29/0241* (2013.01); *E02D 31/002* (2013.01); *E02D 31/025* (2013.01); *E02D 2450/10* (2013.01); *Y02W 30/32* (2015.05)

(58) Field of Classification Search
CPC ... E02B 3/04; E02B 3/12; E02B 3/122; E02D 17/18; E02D 17/20; E02D 17/202; E02D 17/205; E02D 29/0291
See application file for complete search history.

(56) References Cited

U.S. PATENT DOCUMENTS 3,234,741 A * 2/1966 Ionides ..................... 405/270
3,383,864 A    5/1968 Turzilllo
(Continued)

OTHER PUBLICATIONS

Bacher et al., 'Coal Combustion Fly-Ash as Construction Material in a Sanitary Landfill Project,' Oct. 1996, Proceedings of Coal Combustion By-Products Associated with Coal Mining—Interactive Forum, 10 pages.
(Continued)

*Primary Examiner* — Tara M. Pinnock
(74) *Attorney, Agent, or Firm* — Patent Law of Virginia, PLLC; Brian J. Teague

(57) ABSTRACT

Embodiments of the invention comprise a system for strengthening a sloped structure such as a berm, basin, levee, or embankment. The comprises first and second opposing sides, the second side being adjacent the sloped structure; a bottom side adjoining bottom edges of the first and second sides, thereby forming a cavity within the first, second, and bottom sides; fill material disposed within the cavity; an impermeable membrane encapsulating at least a portion of the fill material; and a plurality of reinforcing members disposed within the fill material.

19 Claims, 31 Drawing Sheets

Related U.S. Application Data continuation-in-part of application No. 12/018,515, filed on Feb. 1, 2011, now Pat. No. 8,784,008, which is a continuation-in-part of application No. 12/757,096, filed on Apr. 9, 2010, now Pat. No. 8,430,600, which is a continuation-in-part of application No. 12/636,201, filed on Dec. 11, 2009, now Pat. No. 8,376,657.

(60) Provisional application No. 61/267,593, filed on Dec. 8, 2009.

(51) Int. Cl.
    *E02B 11/00* (2006.01)
    *E02D 31/00* (2006.01)

(56) References Cited

U.S. PATENT DOCUMENTS

| | | | | |
|---|---|---|---|---|
| 3,421,326 | A * | 1/1969 | Vidal | 405/284 |
| 3,705,851 | A | 12/1972 | Brauer | |
| 4,050,254 | A * | 9/1977 | Meheen et al. | 405/285 |
| 4,117,686 | A | 10/1978 | Hilfiker | |
| 4,125,970 | A | 11/1978 | Vidal | |
| 4,166,709 | A | 9/1979 | Valiga | |
| 4,268,993 | A | 5/1981 | Cunningham | |
| 4,287,141 | A | 9/1981 | Russell | |
| 4,521,131 | A | 6/1985 | Nandlal | |
| 4,526,615 | A | 7/1985 | Johnson | |
| 4,555,201 | A | 11/1985 | Paoluccio | |
| 4,596,491 | A | 6/1986 | Dietzler | |
| 4,655,637 | A | 4/1987 | Vignocchi | |
| 4,668,129 | A | 5/1987 | Babcock | |
| 4,818,151 | A | 4/1989 | Moreland | |
| 4,930,939 | A | 6/1990 | Jaecklin | |
| 4,992,003 | A | 2/1991 | Perach | |
| 5,044,833 | A | 9/1991 | Wilfiker | |
| 5,056,960 | A | 10/1991 | Marienfeld | |
| 5,066,169 | A | 11/1991 | Gavin | |
| 5,076,735 | A | 12/1991 | Hilfiker | |
| 5,139,369 | A | 8/1992 | Jaecklin | |
| 5,156,496 | A | 10/1992 | Vidal | |
| 5,276,255 | A | 1/1994 | Stark | |
| 5,419,659 | A | 5/1995 | Mercer | |
| 5,439,318 | A | 8/1995 | Stark | |
| 5,522,682 | A | 6/1996 | Egan | |
| 5,531,547 | A | 7/1996 | Shimada | |
| 5,549,418 | A | 8/1996 | Devine | |
| 5,599,139 | A | 2/1997 | Chewning | |
| 5,658,096 | A | 8/1997 | Von Kanel | |
| 5,707,183 | A | 1/1998 | Akamine | |
| 5,836,129 | A | 11/1998 | Jaecklin | |
| 5,857,807 | A * | 1/1999 | Longo, Sr. | 405/129.7 |
| 5,948,250 | A | 9/1999 | Middleton | |
| 5,961,437 | A * | 10/1999 | Smith et al. | 588/249 |
| 6,238,144 | B1 | 5/2001 | Babcock | |
| 6,296,422 | B1 | 10/2001 | Ferraiolo | |
| 6,443,663 | B1 * | 9/2002 | Scales et al. | 405/262 |
| 6,808,339 | B2 | 10/2004 | Peterson | |
| 6,824,681 | B2 | 11/2004 | Engwer | |
| 6,893,193 | B2 | 5/2005 | Santha | |
| 7,029,204 | B1 | 4/2006 | Webber | |
| 7,097,390 | B1 | 8/2006 | Moss | |
| 7,118,308 | B2 | 10/2006 | Hater | |
| 7,147,405 | B2 | 12/2006 | Ferraiolo | |
| 7,314,336 | B2 | 1/2008 | Moss | |
| 7,399,144 | B2 | 7/2008 | Kallen | |
| 7,469,859 | B1 | 12/2008 | Campbell | |
| 8,246,274 | B1 | 8/2012 | Hall | |
| 2003/0185634 | A1 * | 10/2003 | Babcock | 405/284 |
| 2004/0018061 | A1 | 1/2004 | Jansson | |
| 2004/0079699 | A1 | 4/2004 | Engwer | |
| 2005/0252144 | A1 * | 11/2005 | MacDonald et al. | 52/598 |
| 2005/0271478 | A1 | 12/2005 | Ferraiolo | |
| 2009/0050025 | A1 | 2/2009 | Wissa | |
| 2009/0285640 | A1 | 11/2009 | Hilfiker | |

OTHER PUBLICATIONS

Delaware Dept. of Natural Resources and Environmental Control, 'II. Municipal Solid Waste and Landfill Capacity in Delaware,' Nov. 2005, p. 12-58., available at http://www.dnrec.delaware.gov/SWMTWG/Documents/2ac98919f32b4f269b135dfb50-4c3a3aDecember13BackgroundonMSWsituationinDelaware.pdf.

Conservation Approach to Coal Combustion Products Handling, MACTEC, 42 pages, available at http:// conservationengineers.org/conferences/2010presentations/CoalConversion_Schmitt.pdf, undated.

Kevin Robinson, Dayakar Penumadu, Douglas Brown, Nancy Roberts and Willie Liew; A New Large Volume Application for Beneficial Use of Coal Combustion Products in Hydrologically and Environmentally Responsible Engineered Landfill Containment Berms; 6 pages; Aug. 31, 2009.

* cited by examiner

SYSTEM AND METHOD FOR STRENGTHENING A SLOPED STRUCTURE SUCH AS A BERM, BASIN, LEVEE, EMBANKMENT, OR THE LIKE

CROSS-REFERENCE TO RELATED APPLICATIONS

This application is a divisional and claims priority to co-pending U.S. application Ser. No. 13/447,625, filed Apr. 16, 2012, which in turn is a continuation-in-part of and claims priority to U.S. application Ser. No. 13/018,515, filed Feb. 1, 2011 and issued as U.S. Pat. No. 8,784,008 on Jul. 22, 2014, which in turn is a continuation-in-part of and claims priority to U.S. application Ser. No. 12/757,096, filed Apr. 9, 2010 and issued as U.S. Pat. No. 8,430,600 on Apr. 30, 2013, which in turn is a continuation-in-part of and claims priority to U.S. application Ser. No. 12/636,201, filed Dec. 11, 2009 and issued as U.S. Pat. No. 8,376,657 on Feb. 19, 2013, which in turn claims priority to provisional U.S. Application No. 61/267,593, filed Dec. 8, 2009, the contents of which are incorporated herein by reference in their entirety.

FIELD OF THE INVENTION

The present invention generally relates to construction of containment berms and other embankments and structures.

BACKGROUND OF THE INVENTION

Berms are commonly used in situations where the ability to construct vertically has been constrained by the inability to expand laterally at a slope that allows the desired vertical height to be attained without failure. For example, berms are often used to expand the capacity of landfills that are nearing or have reached their capacity but which do not have space to expand outward. In such situations, berms may be constructed around some or all of the landfill to increase the vertical capacity. Referring now to FIG. 1, a landfill 10 comprises a large waste-receiving recess 12 in the ground 14. The recess has a surface 16 that may or may not have a liner system in place. The waste in the landfill may comprise any material that is typically placed in a landfill, such as municipal solid waste (MSW), residential waste, industrial waste, fossil fuel combustion material, construction debris, hazardous waste and/or yard waste, etc. The recess is surrounded by an edge 18. The edge is typically substantially horizontal, but may alternatively be substantially sloped. As seen in FIG. 1, the existing accumulation of waste 20 has filled the recess 12. However, the capacity of the landfill can be increased by constructing a berm on the edge 18.

Berms often comprise a reinforced portion and backfill material. The reinforced portion comprises structural fill material with reinforcing members disposed (typically substantially horizontally) therein. These berms allow for the desired vertical height in a limited space. These berms are very expensive to construct, however, on a relative basis, as material with very tight specifications must be acquired and transported and the cost of the reinforcement itself can be prohibitive in many circumstances. Therefore what is needed is a method to construct these berms that allows for economical construction and that utilizes material that can generate the revenue necessary to cover the bulk of the cost of the entire berm while being environmentally sound and regulatory agency acceptable.

BRIEF SUMMARY OF THE INVENTION

In one embodiments of the invention, a system for strengthening a sloped structure comprises first and second opposing sides, the second side being adjacent the sloped structure; a bottom side adjoining bottom edges of the first and second sides, thereby forming a cavity within the first, second, and bottom sides; fill material disposed within the cavity; an impermeable membrane encapsulating at least a portion of the fill material; and a plurality of reinforcing members disposed within the fill material.

In addition to the system for strengthening a sloped structure, as described above, other aspects of the present invention are directed to corresponding methods for strengthening a sloped structure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 17A:
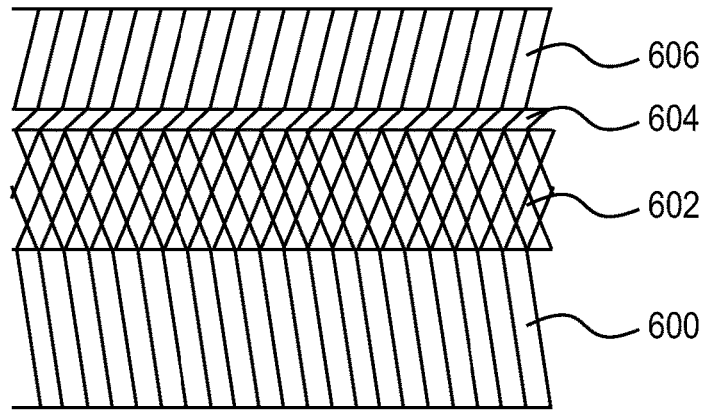
Figure 17B:
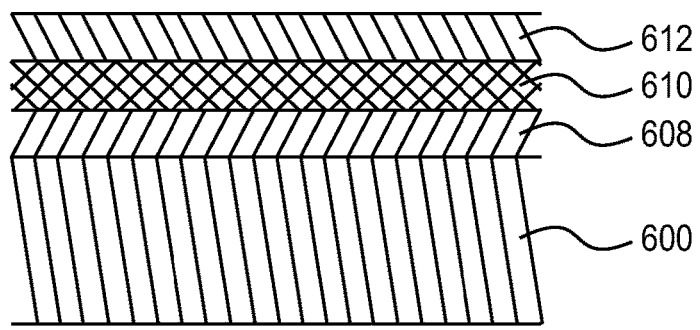
Figure 17C:
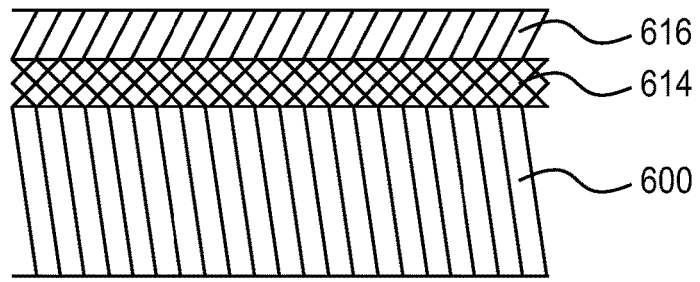
Figure 18:
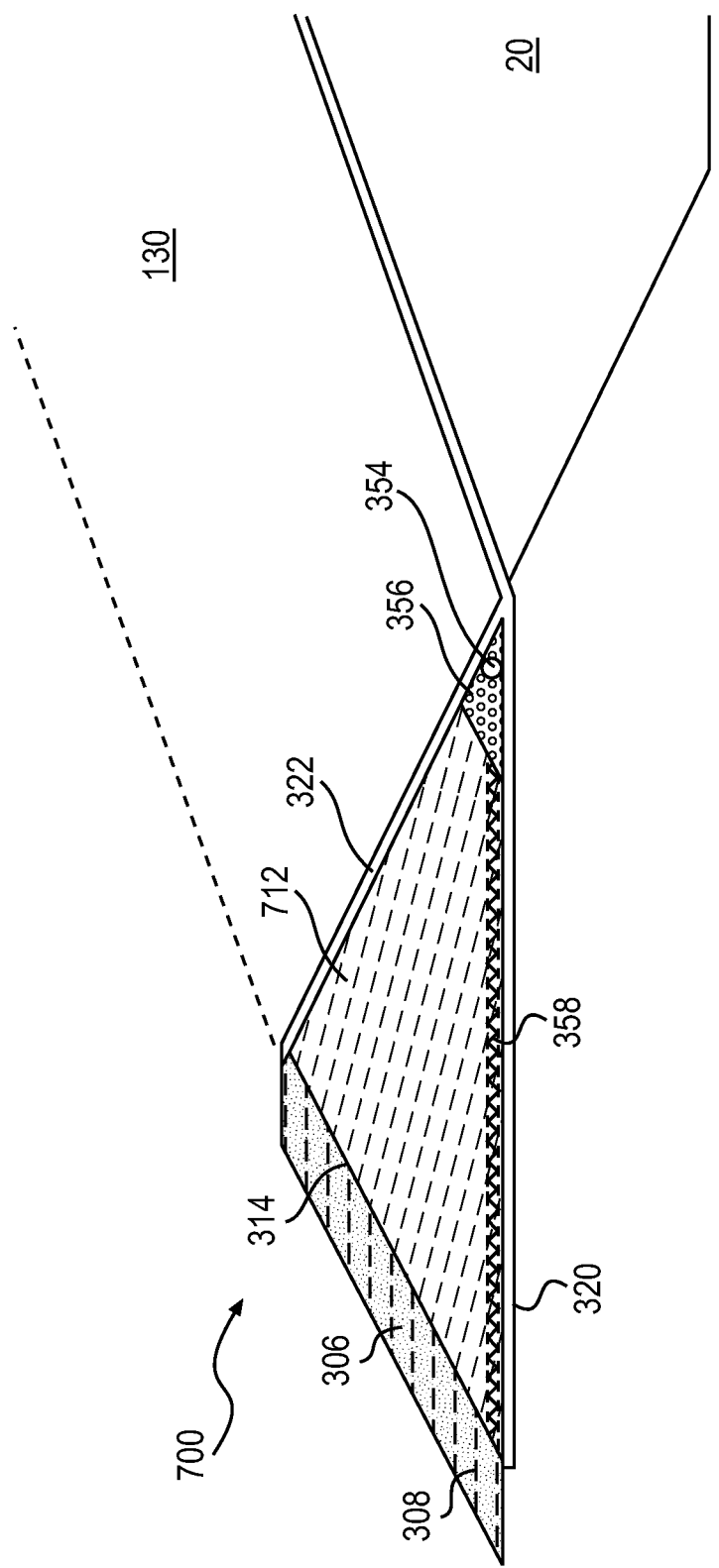
Figure 19:
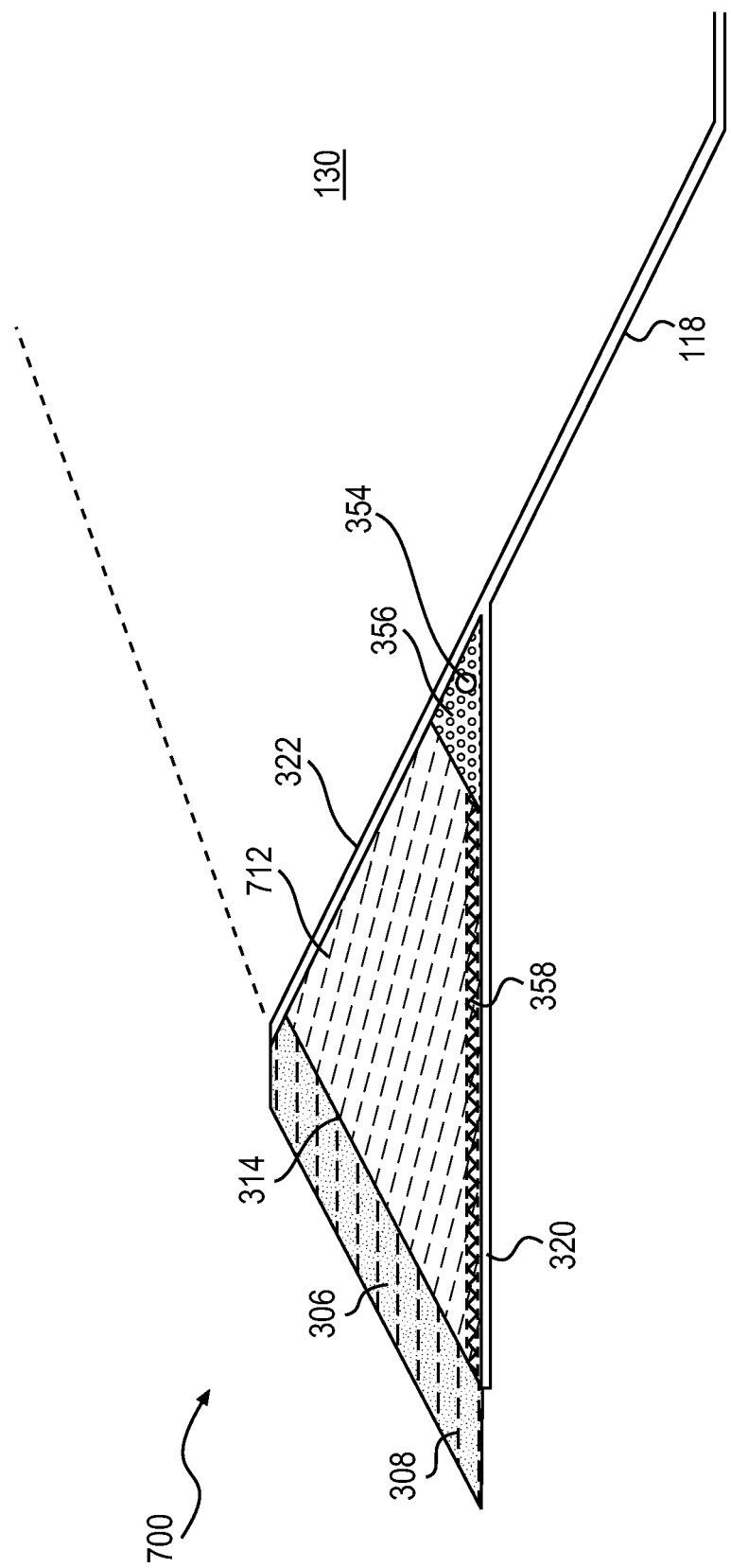
Figure 20:
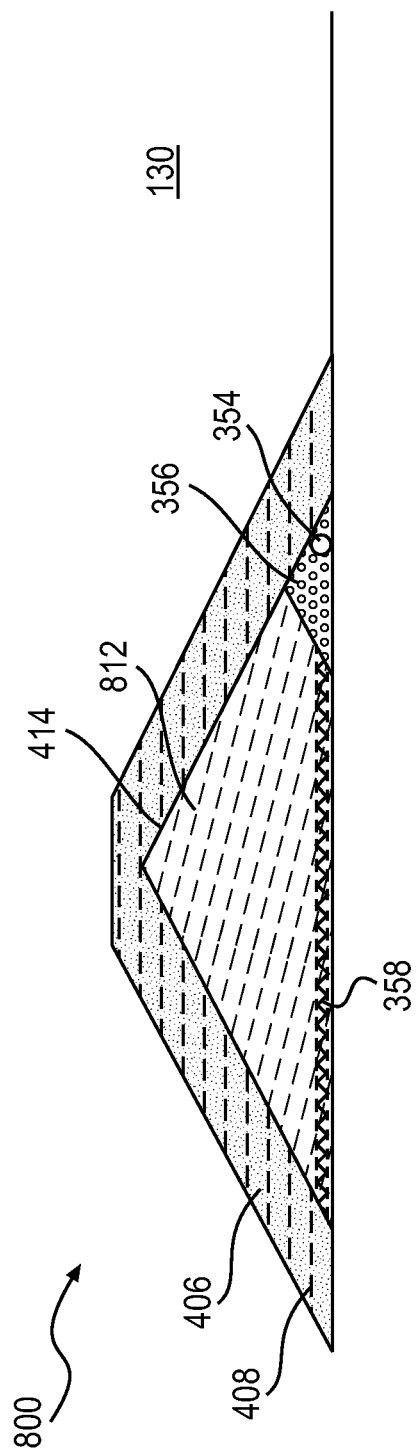
Figure 21:
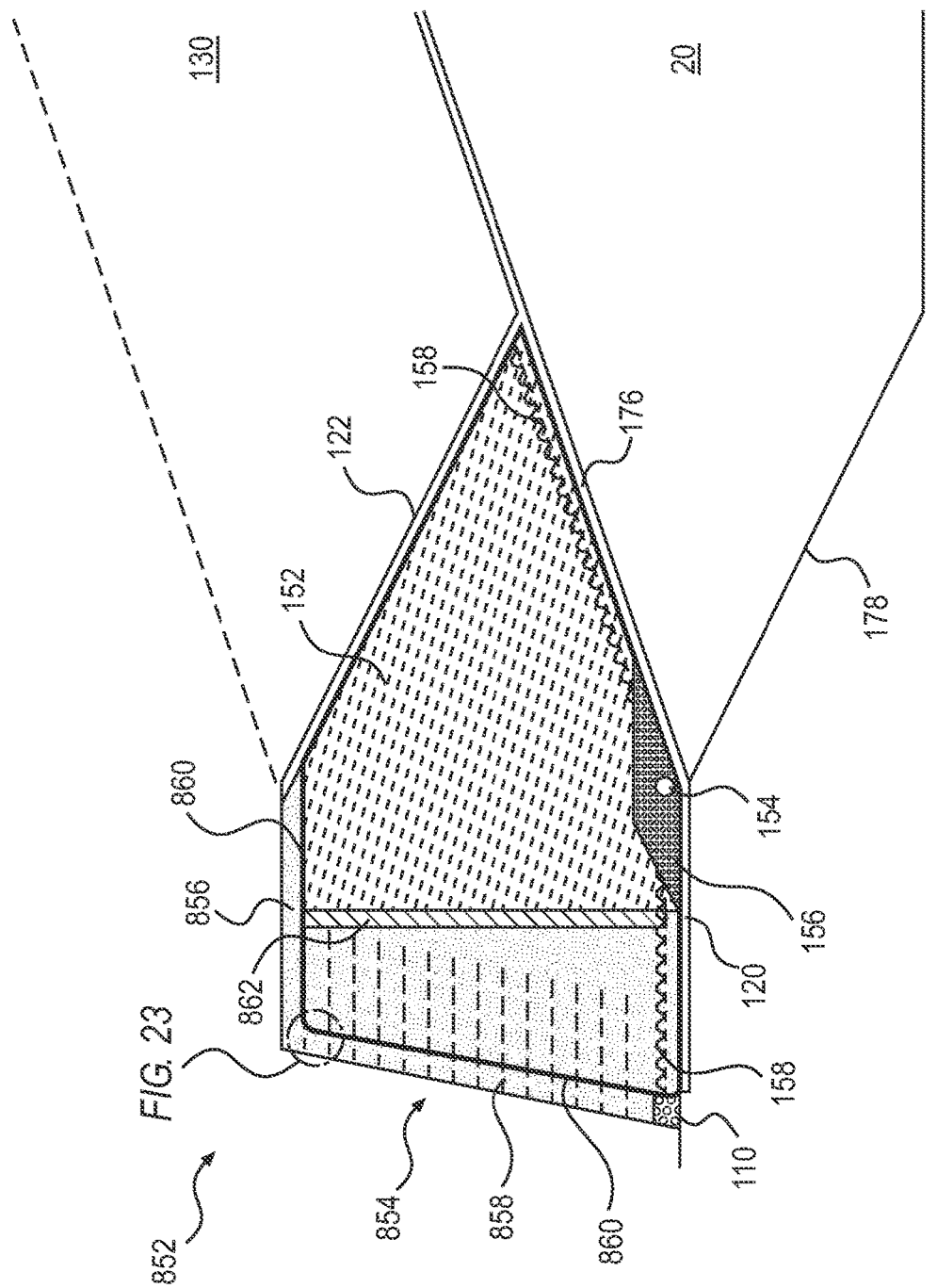
Figure 22:
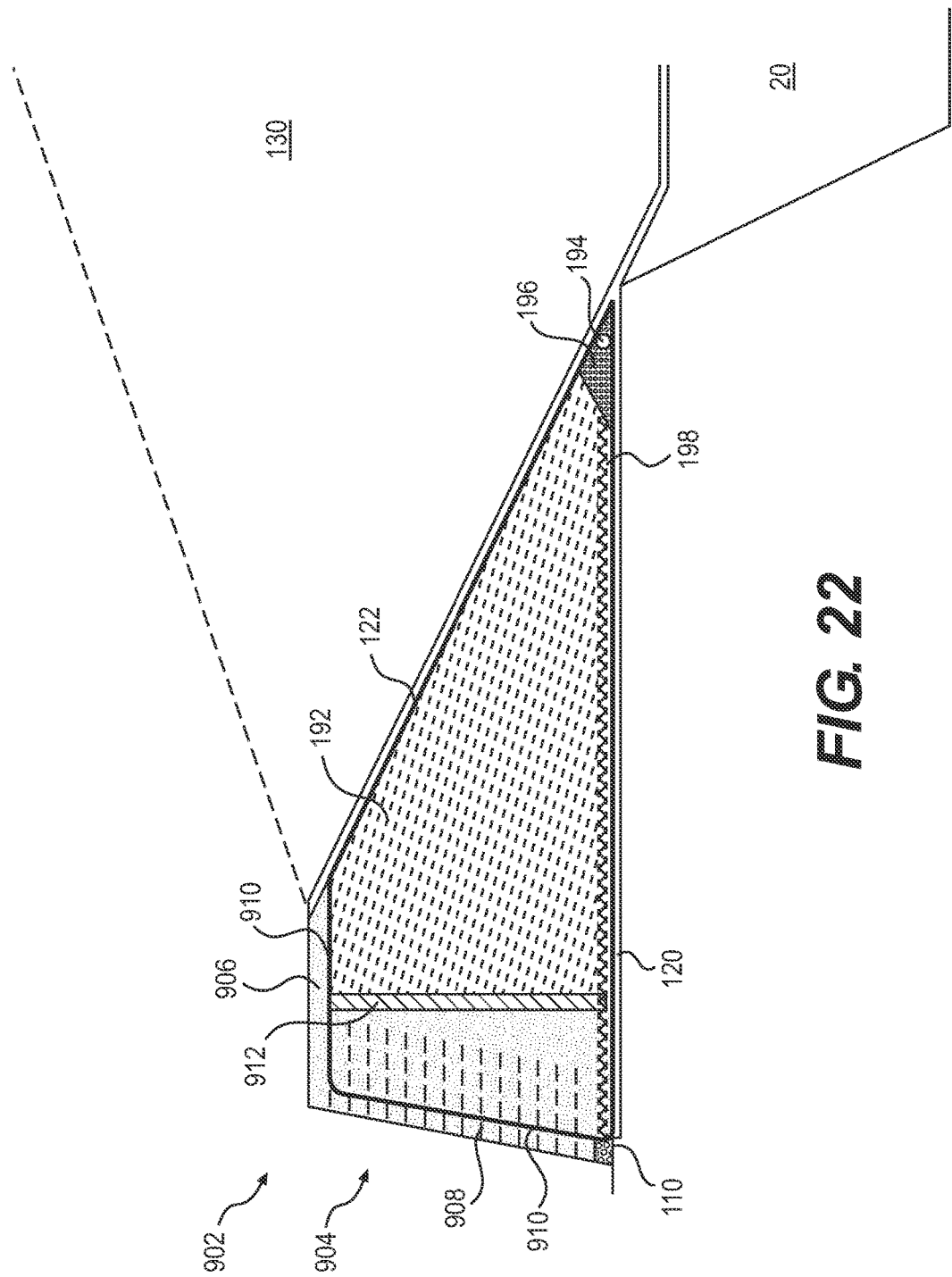
Figure 23:
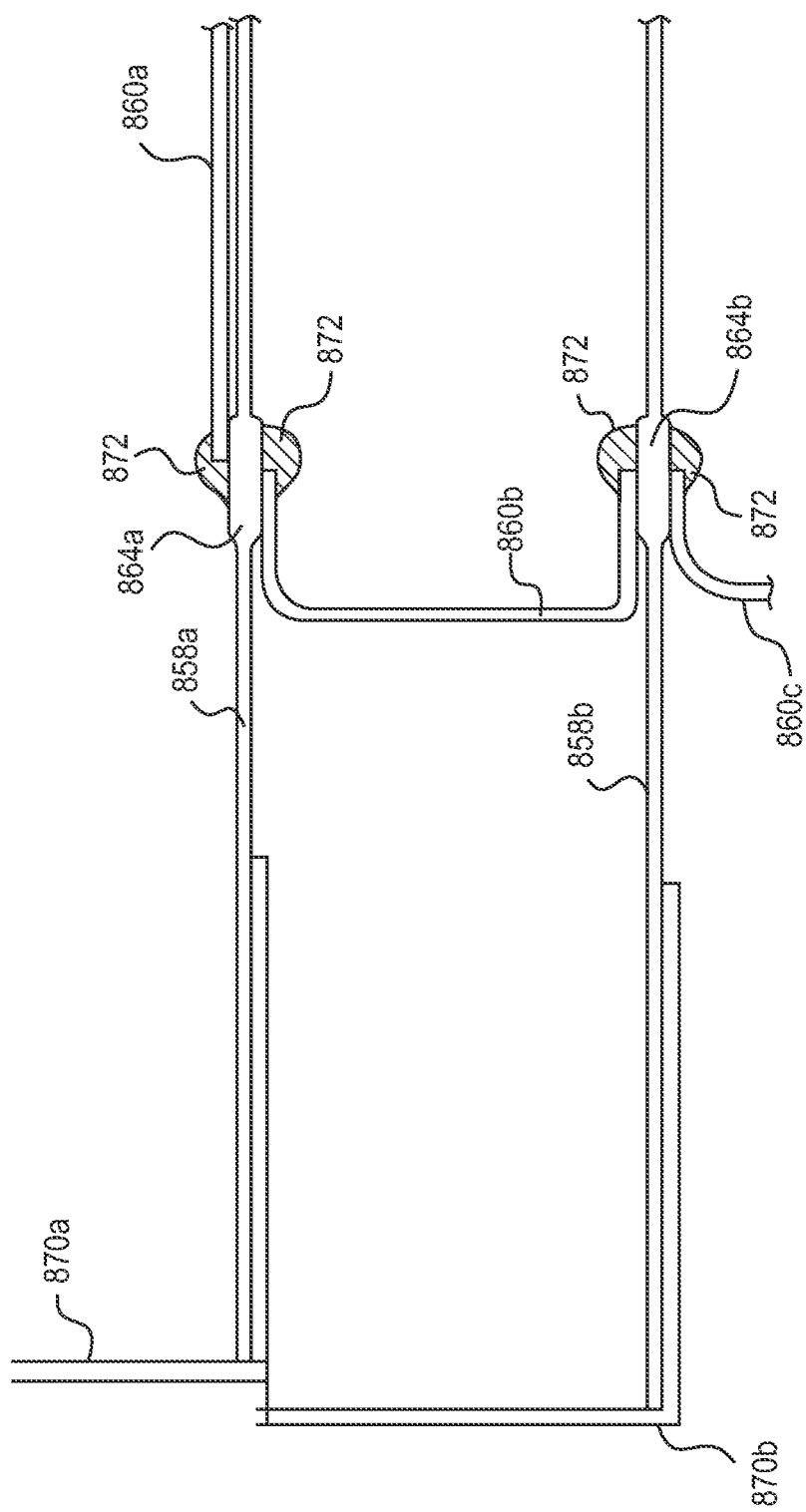
Figure 24A:
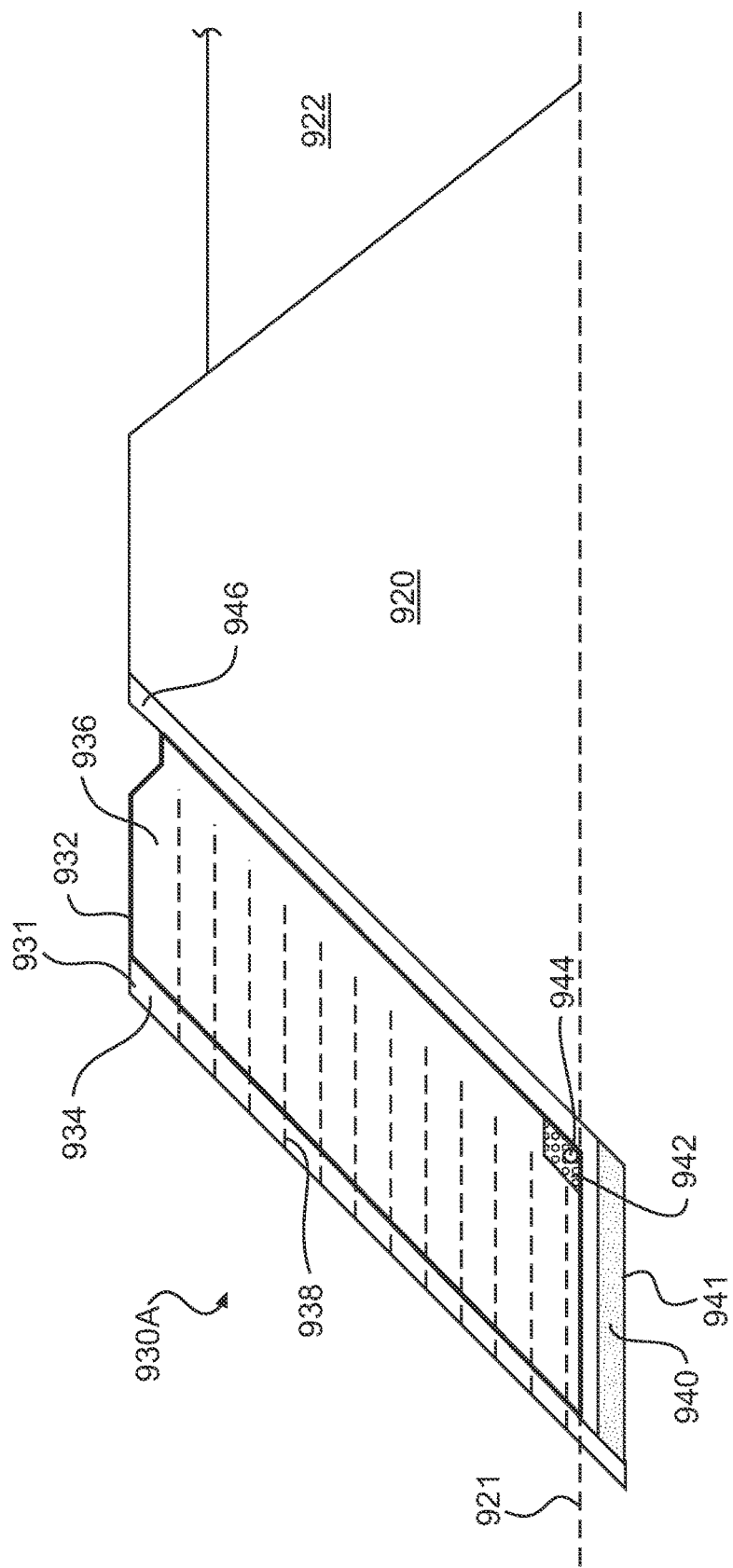
Figure 24B:
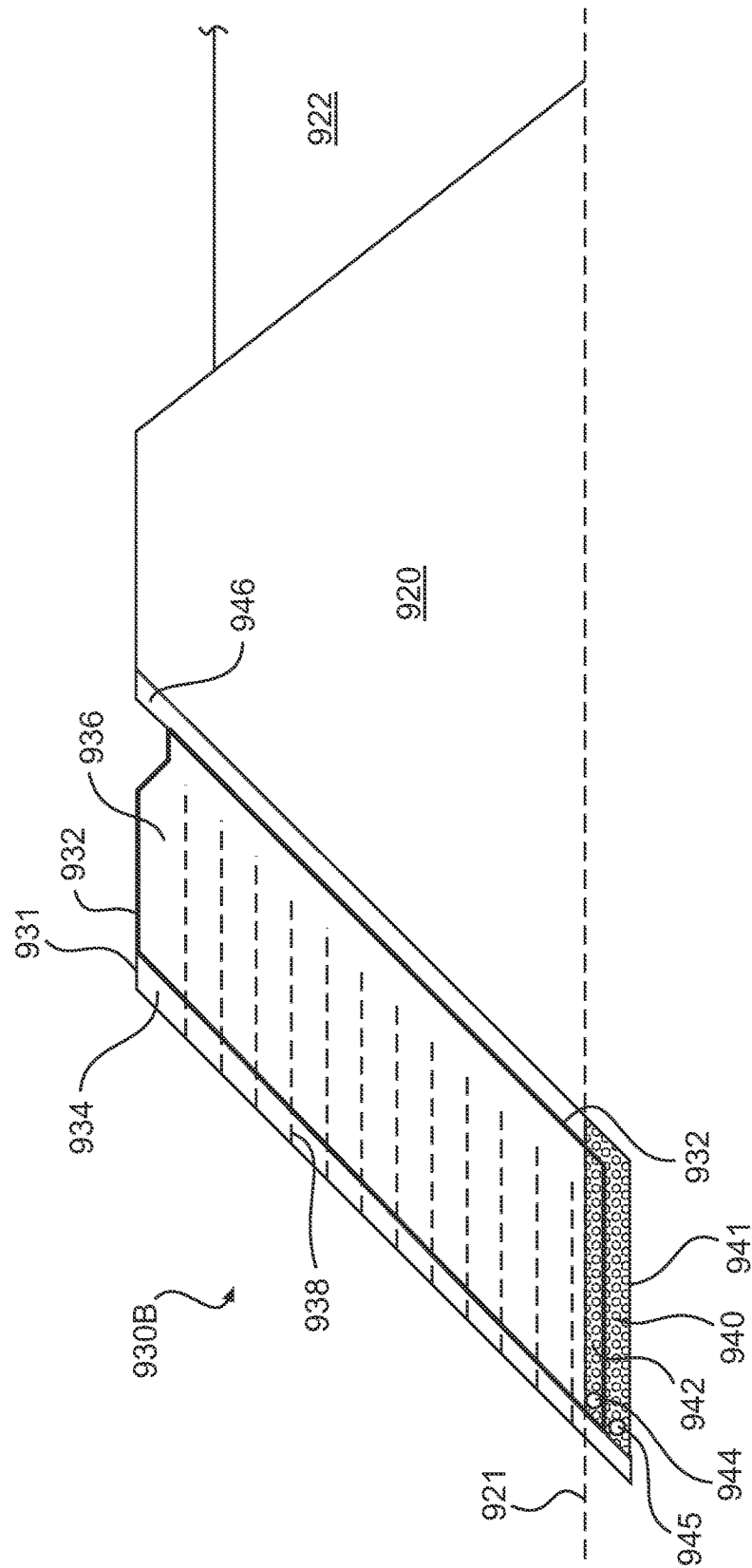
Figure 24C:
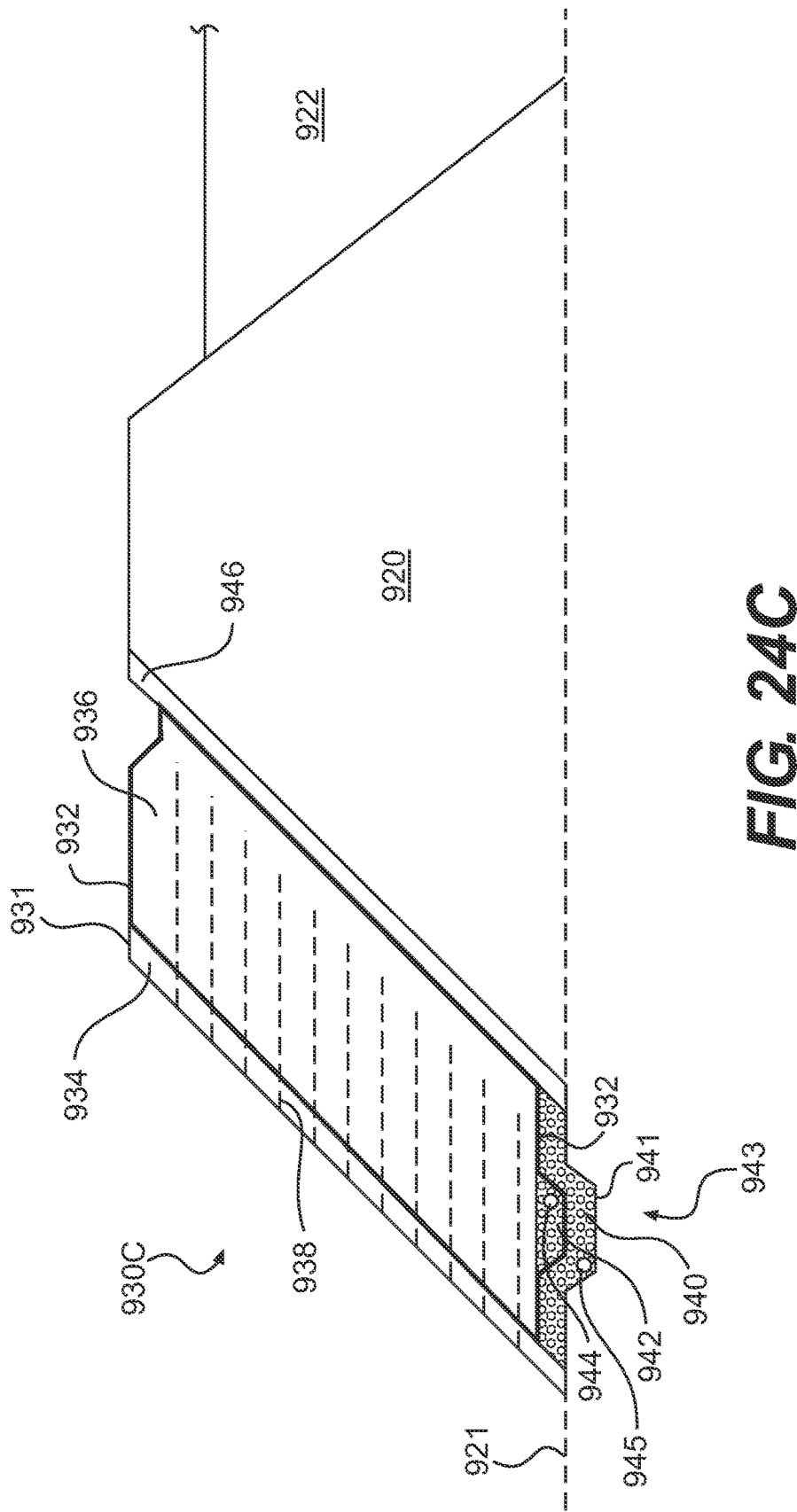
Figure 25:
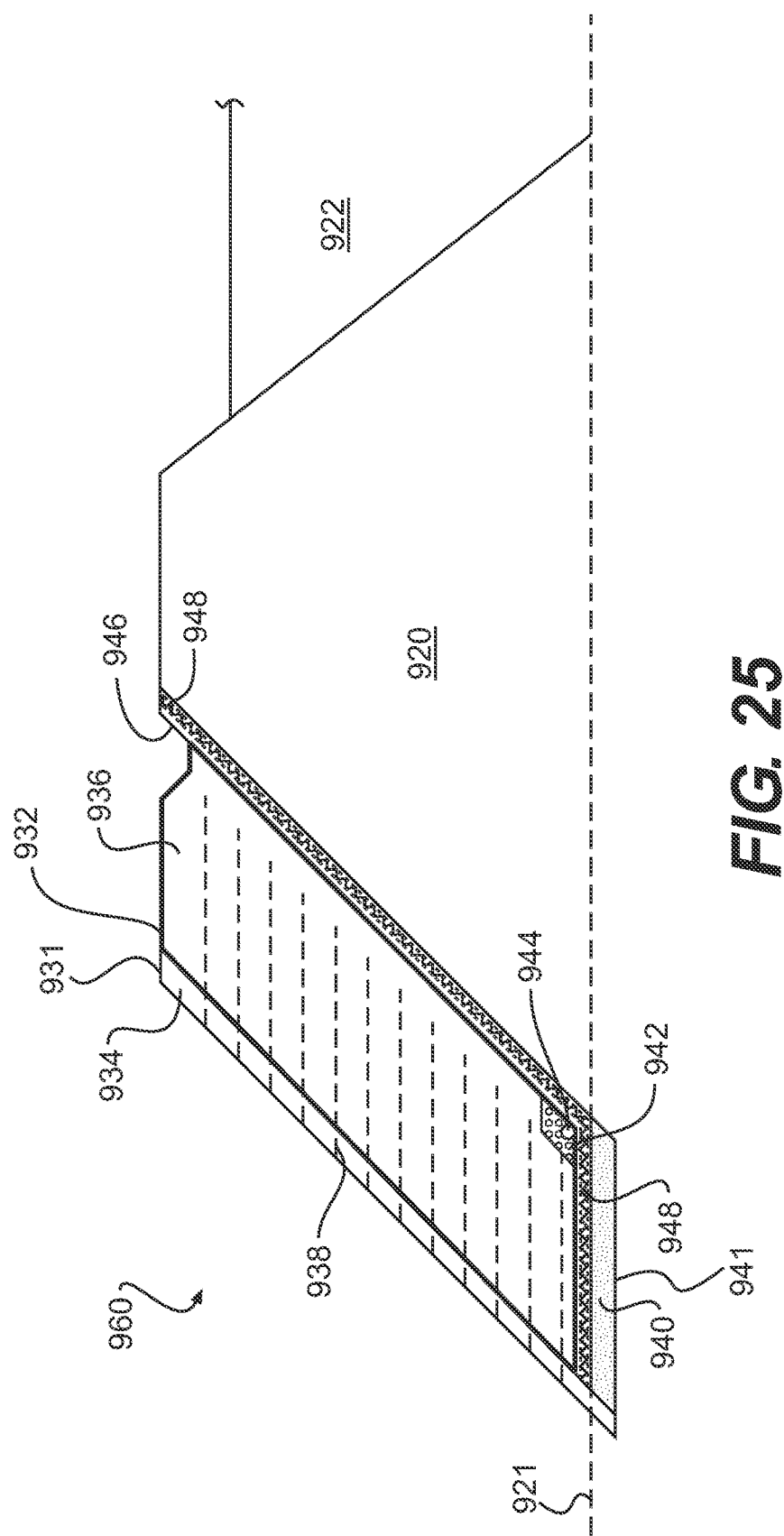
Figure 26:
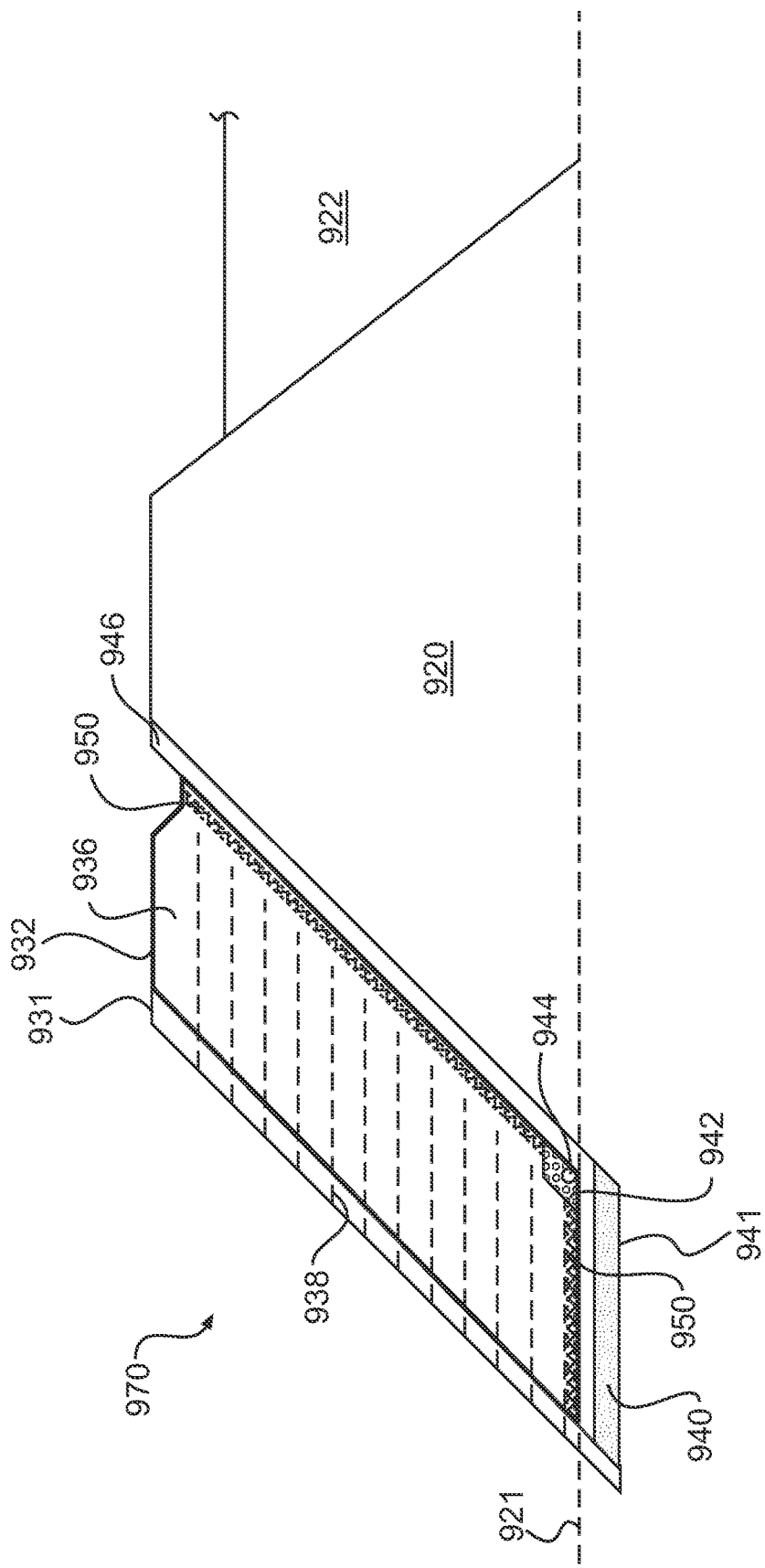
Figure 27:
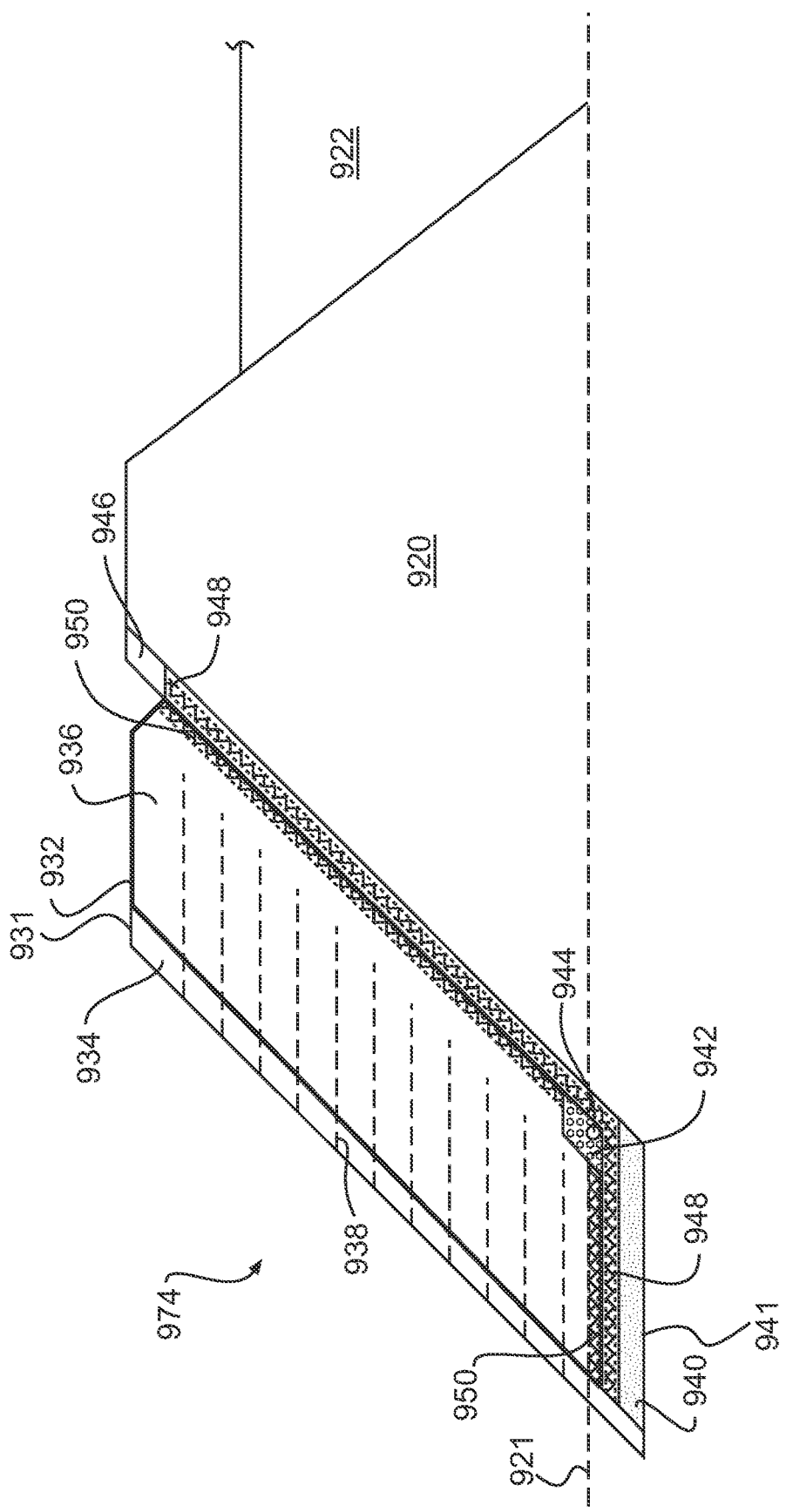
Figure 28:
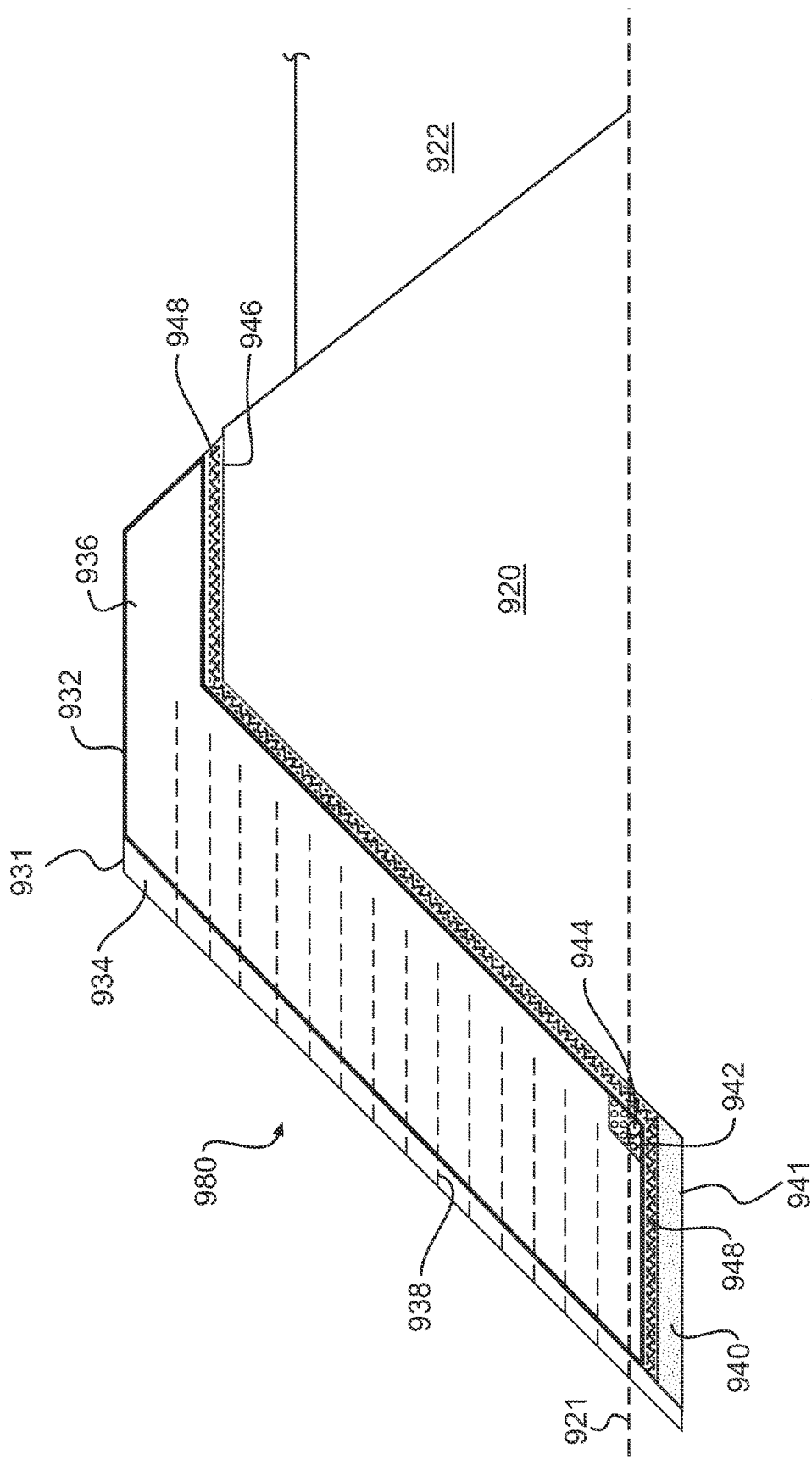
Figure 29:
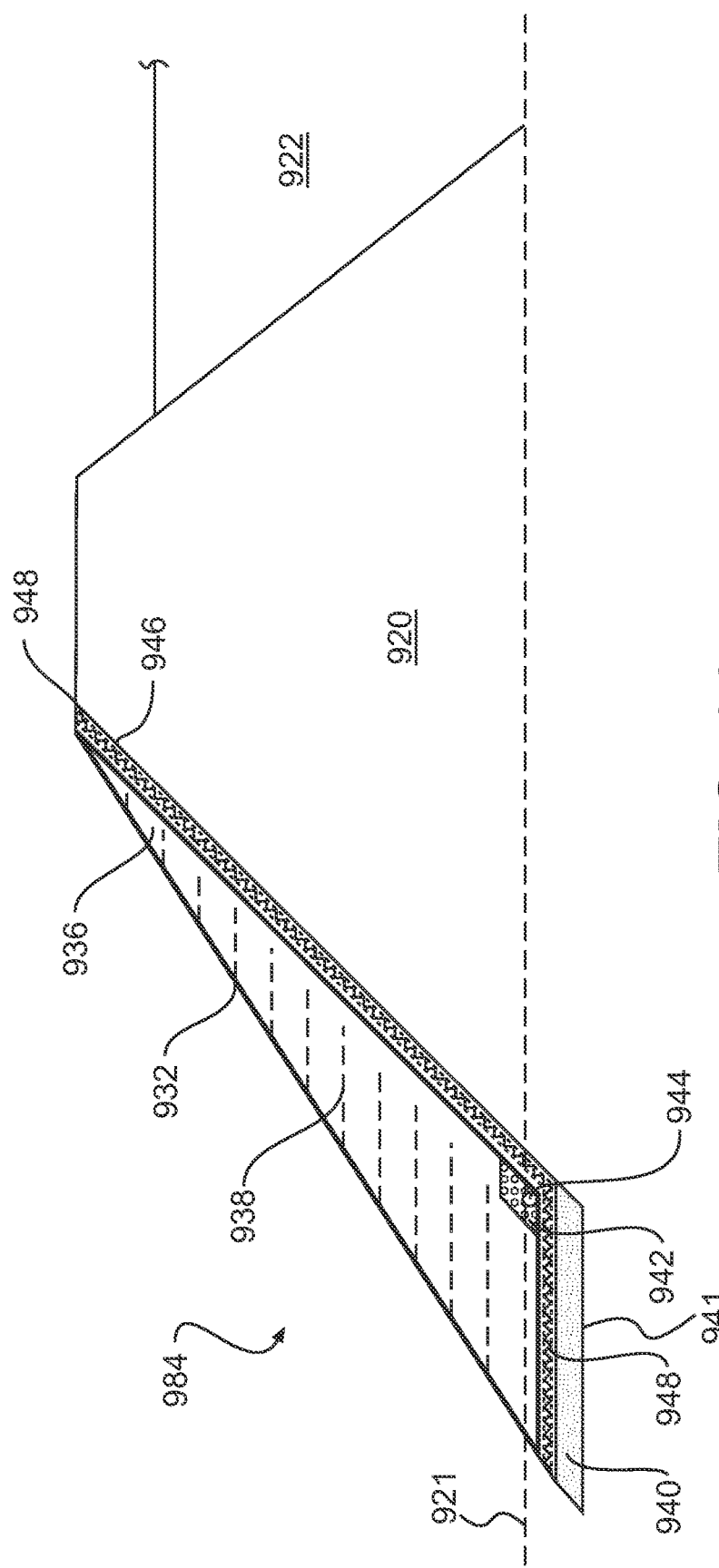

FIGS. 17A-C illustrate simplified cross-sectional diagrams of a Subtitle D landfill liner and two possible equivalents thereof;

FIG. 18 is a simplified cross-sectional diagram of a berm for increasing the capacity of an existing landfill, in accordance with an alternative embodiment of the present invention;

FIG. 19 is a simplified cross-sectional diagram of a berm for creating a landfill or laterally increasing the capacity of an existing landfill, in accordance with an alternative embodiment of the present invention;

FIG. 20 is a simplified cross-sectional diagram of a berm, in accordance with an alternative embodiment of the present invention;

FIG. 21 is a simplified cross-sectional diagram of a berm for increasing the capacity of an existing landfill, in accordance with an alternative embodiment of the present invention;

FIG. 22 is a simplified cross-sectional diagram of a berm for creating a landfill or laterally increasing the capacity of an existing landfill, in accordance with an alternative embodiment of the present invention;

FIG. 23 is a simplified cross-sectional diagram of a portion of the berm of FIG. 21;

FIGS. 24A-C are simplified cross-sectional diagrams of a system for strengthening a slope of a containment structure, in accordance with embodiments of the present invention;

FIG. 25 is a simplified cross-sectional diagram of a system for strengthening a slope of a containment structure, in accordance with an alternative embodiment of the present invention;

FIG. 26 is a simplified cross-sectional diagram of a system for strengthening a slope of a containment structure, in accordance with an alternative embodiment of the present invention;

FIG. 27 is a simplified cross-sectional diagram of a system for strengthening a slope of a containment structure, in accordance with an alternative embodiment of the present invention;

FIG. 28 is a simplified cross-sectional diagram of a system for strengthening a slope of a containment structure, in accordance with an alternative embodiment of the present invention; and FIG. 29 is a simplified cross-sectional diagram of a system for strengthening a slope of a containment structure, in accordance with an alternative embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The combustion of coal or wood in coal or wood fired power plants produces several materials, including: fly ash, bottom ash, boiler slag, and flue gas desulphurization (FGD) material. Together, these materials represent what is generally referred to as ash or sometimes as FFCPs—Fossil Fuel Combustion Products. These materials are well-documented sources of heavy metal contamination in air, water and on land. Contaminants include selenium, mercury, lead, boron, cadmium, thallium, polycyclic aromatic hydrocarbons compounds, etc. There is an increased awareness and concern regarding the long term health effects of these materials on both humans and the environment as these contaminants can become mobile if not sequestered properly.

FFCPs generally are a very good material suitable for utilization in embankments, re-enforced embankments, walls, berms, roadways, etc. as they tend to be coarse in nature and offer superior shear strength, possess a high friction angle, and have high bearing capacity. Currently, approximately 53 million tons/year of the 130 million tons/year of FFCPs produced are beneficially used in structural, concrete, wall board and other applications. Upcoming regulatory changes may require that FFCPs be treated as contaminated waste, thereby eliminating many of the uses and producing a pronounced strain on the economy. Additionally, landfill capacity across the United Sates will be severely stressed to handle the increased demand for simply disposing of these FFCPs. The utilization of FFCPs and other contaminated materials in embodiments of the present invention will offer a suitable, environmentally-, regulatory- and financially-sound alternative use of these types of materials.

In addition, during the development and use of land for many residential, commercial, agricultural, industrial and other purposes, non-hazardous contaminated soils and media (concrete, asphalt, glass, etc.) are created. These materials can be contaminated with metals, acids, bases, volatile and semi-volatile organic compounds, petroleum products, and a host of other contaminates. These materials are well documented sources of contamination in air, water and on land. There is an ongoing and increased awareness and concern of the long term health effects of these materials on both humans and the environment as these elements can become mobile if not sequestered properly as well. These materials, although tainted, are nonetheless valuable for certain beneficial uses, including as a fill (structural or backfill) material in reinforced embankment applications.

The materials (FFCPs and contaminated soils/media) used in embodiments of the invention encompass a very broad entire spectrum of soil and material types and could be characterized as fine grained, coarse grained, homogeneous, non-homogeneous, etc. However characterized, in the embodiments described herein, the material available can be used to construct berms for landfill expansion, roadway and berm construction and are readily available in most locations.

Figure 1:
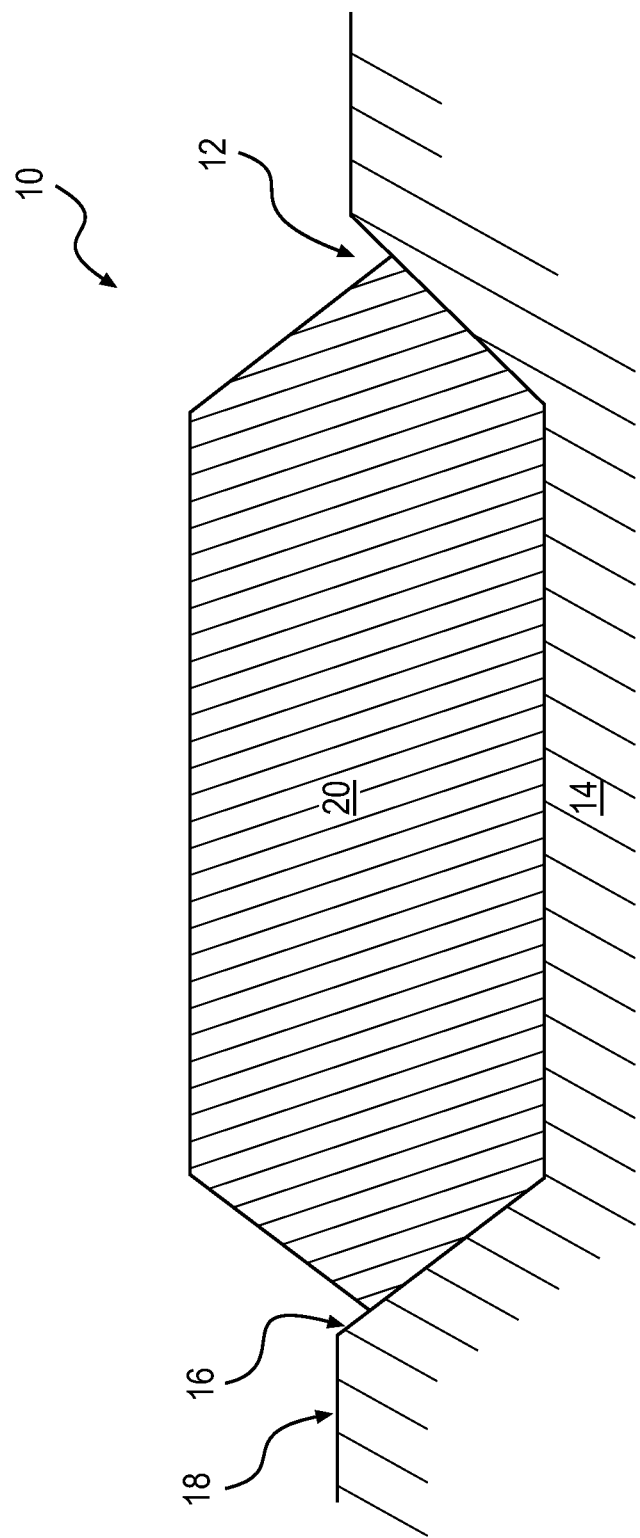
FIG. 1 is a simplified cross-sectional diagram of a prior art landfill that would benefit from embodiments of the present invention.

A berm according to embodiments of the present invention may be used to expand the capacity of a landfill. Such a berm is typically constructed on at least a portion of the upper, outer edge (18 of FIG. 1) of a landfill. Such a berm raises the height of the exterior walls of a landfill, thereby enlarging the waste-receiving recess (12 of FIG. 1). Such a berm may be of any suitable height, commonly about thirty to eighty feet tall. Such a berm may be of any suitable length, commonly hundreds or even thousands of feet long. At least a portion of such a berm would sit on at least a portion of the edge surface of the landfill, and the berm is substantially parallel to corresponding portions of the outer perimeter. Alternatively, a berm according to embodiments of the present invention may be used to create a new landfill by constructing one or more such berms around the desired perimeter of the new landfill. In such an alternative embodiment, the one or more berms define and create the waste-receiving recess of the landfill.

Figure 2:
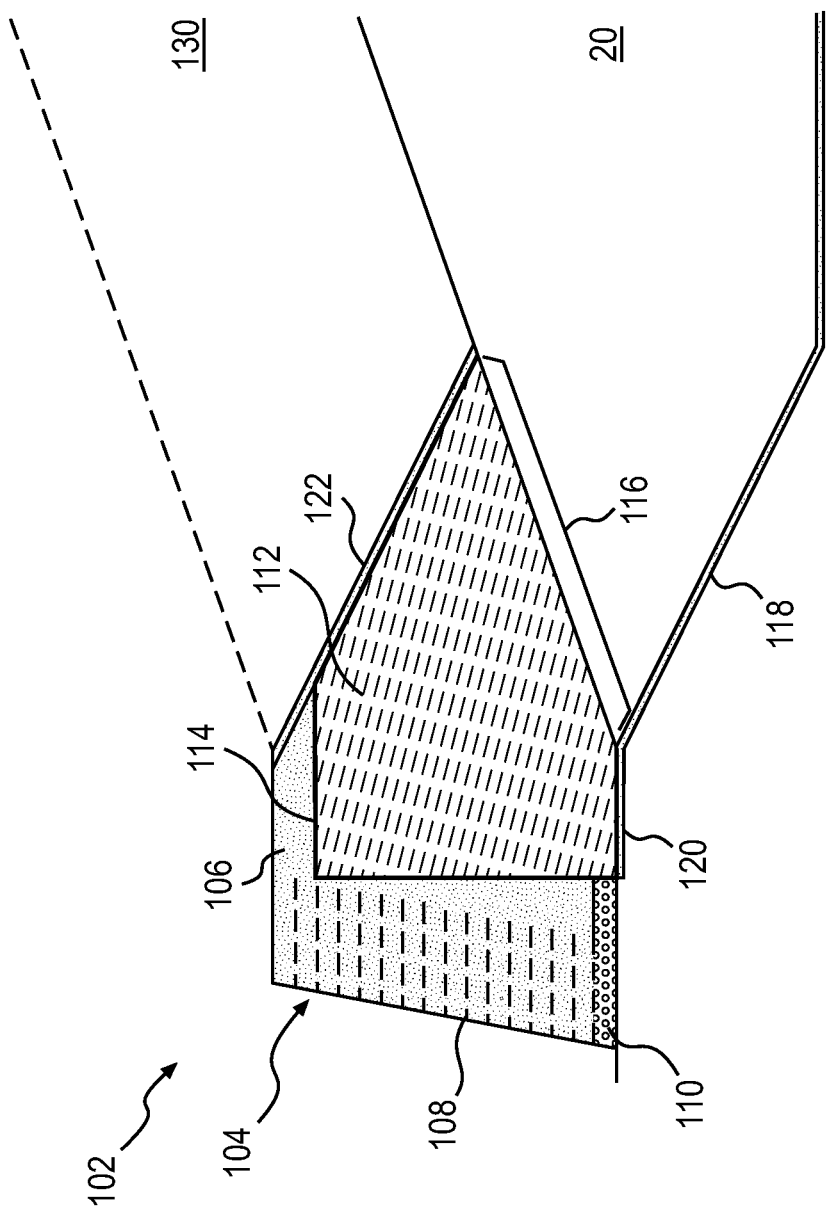
FIG. 2 is a simplified cross-sectional diagram of a berm for increasing the capacity of an existing landfill, in accordance with one embodiment of the present invention.

Referring now to FIG. 2, a simplified cross-sectional diagram of a berm for increasing the capacity of an existing landfill is illustrated in accordance with one embodiment of the present invention. The berm 102 of FIG. 2 comprises a reinforced portion 104 and backfill material 112. The reinforced portion 104 is constructed using typical construction techniques and comprises structural fill material 106 and a plurality of reinforcing members 108 disposed (typically horizontally) therein. The reinforced portion may have a foundation of granular fill material 110. As seen in FIG. 2, the reinforced portion has opposing inner and outer surfaces. The outer surface is commonly termed the "face" of the wall and the inner surface is adjacent the backfill material. The reinforced portion may optionally have facing material covering the face of the reinforced portion. The facing material, if present, is typically attached to or integral with the reinforcing members. The structural fill typically comprises relatively homogeneous soils that are relatively free of debris, foreign objects, excess silt, roots, and organics. The granular fill is typically well graded sand, well graded sand and gravel, crushed stone, or other approved granular material.

The backfill material 112 comprises contaminated fill material. The contaminated fill material can be any suitable waste product that has the desired coarseness, shear strength, high friction angle, and high bearing capacity. The contaminated fill material should be non-hazardous, but is nonetheless expensive to properly dispose of. The contaminated fill material may comprise FFCPs, non-hazardous contaminated soils, contaminated crushed glass, contaminated crushed concrete, contaminated crushed asphalt, sand blast grit, foundry sands, properly de-watered dredge spoils, and combinations of these materials. Importantly, the backfill material is at least partially encapsulated by an impermeable membrane 114. FIG. 2 illustrates a berm with a partially encapsulated backfill. In the embodiment of FIG. 2, the portion 116 of the backfill material adjacent the existing waste accumulation is not covered by an impermeable membrane.

The impermeable membrane is, when intact, impermeable to fluids and/or gases. The impermeable membrane used in embodiments of the invention may comprise, for example, a geomembrane, a compacted low permeability clay liner, a geosynthetic clay liner (GCL), geomembrane laminated Geosynthetic Clay Liner, etc., or liner systems that will typically conform to Subtitle D of the Resource Conservation and Recovery Act (RCRA), conform to an approved equivalent of Subtitle D of RCRA (described in further detail below), or conform to a liner and/or cover system requirement of any appropriate regulatory agency. The geomembrane may comprise one of low-density polyethylene (LDPE), high-density polyethylene (HDPE), polyvinyl chloride (PVC), polyurea or polypropylene (PP). Because of the potentially large size of such a berm and the limited size of commercially available geomembranes, the impermeable membrane may comprise a plurality of impermeable membrane sections joined with impermeable seams. The plurality of impermeable membrane sections are typically joined using any desirable method of joining such material, including but not limited to extrusion welding, solvent welding, fusion welding, and/or gluing (especially for PVC or PP).

Figure 3:
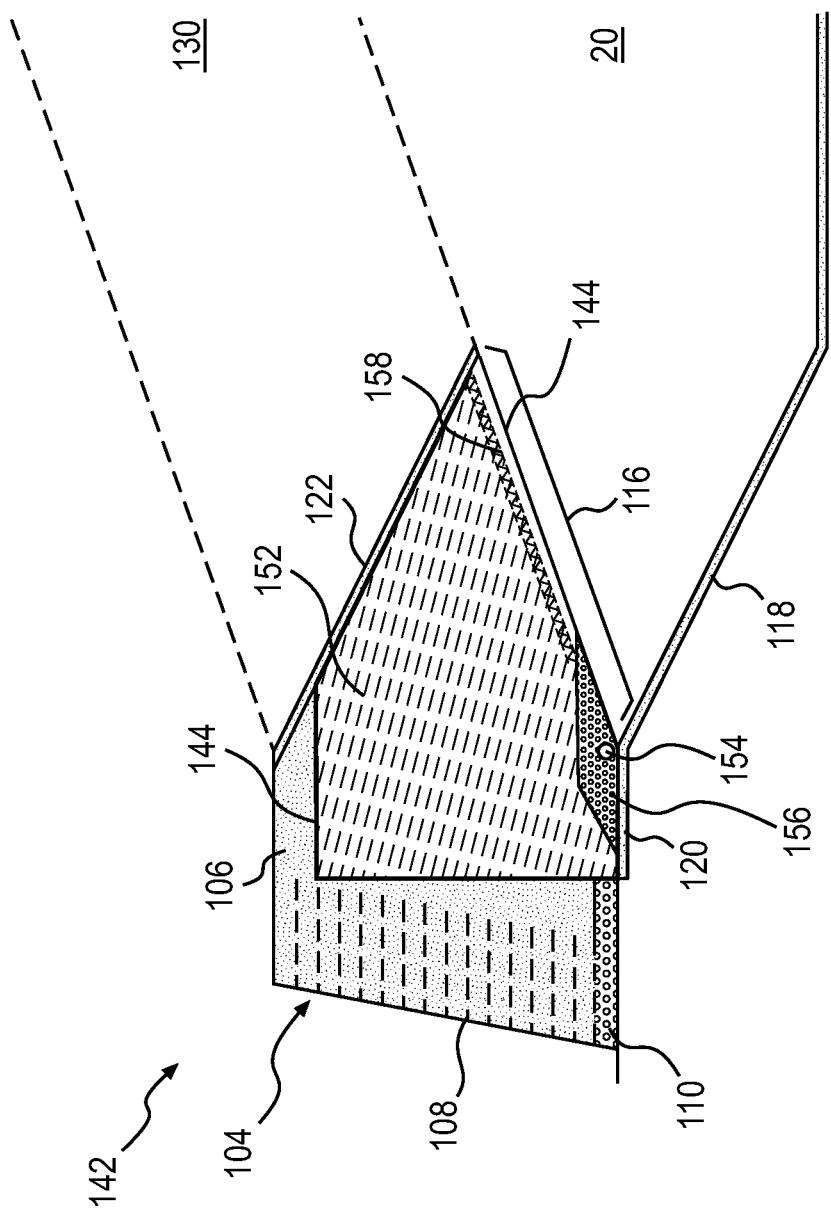
FIG. 3 is a simplified cross-sectional diagram of a berm for increasing the capacity of an existing landfill, in accordance with an alternative embodiment of the present invention.
Figure 4:
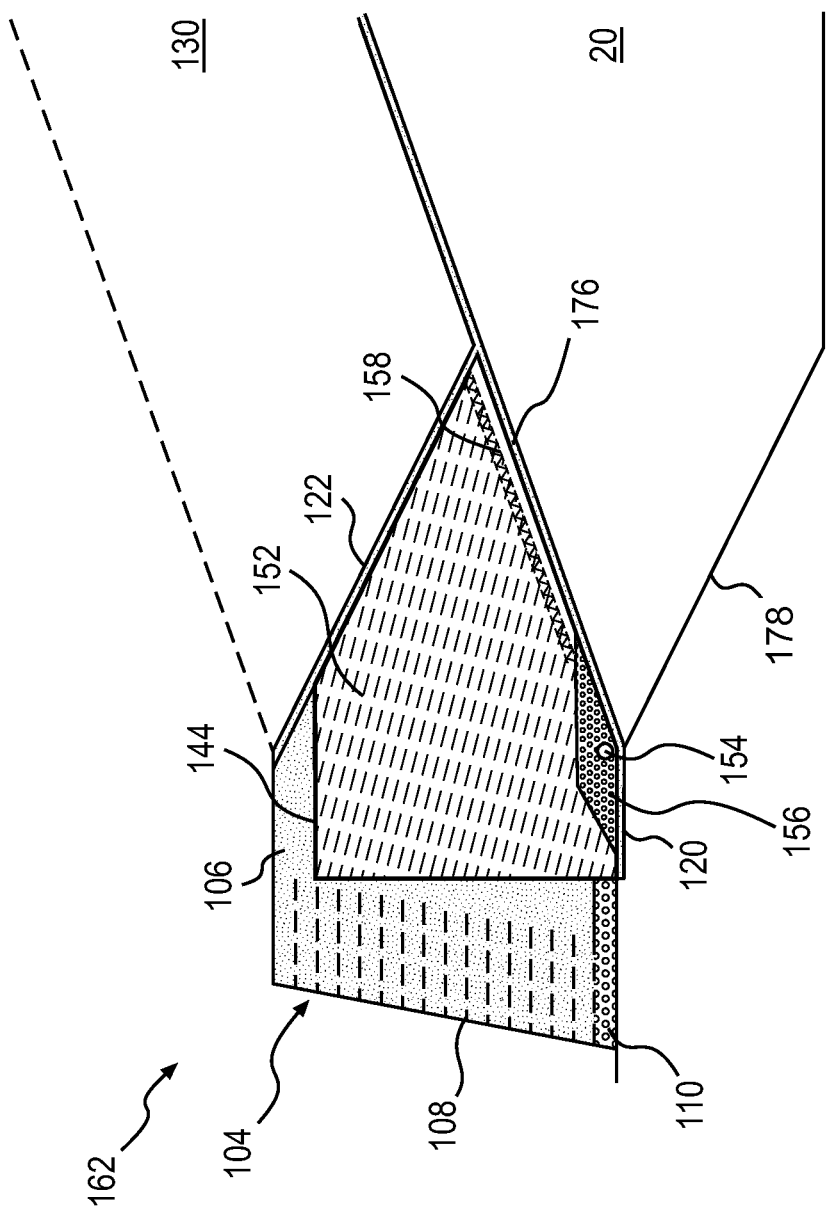
FIG. 4 is a simplified cross-sectional diagram of a berm for increasing the capacity of an existing landfill, in accordance with an alternative embodiment of the present invention.

In the embodiments illustrated in FIGS. 2-4, the backfill material has an inner surface adjacent the inner surface of the reinforced portion, opposing top and bottom surfaces, and upper and lower sloped outer surfaces. The lower sloped outer surface slopes outward and upward from the bottom surface to the upper sloped outer surface. The upper sloped outer surface slopes outward and downward from the top surface to the lower sloped outer surface. The lower sloped outer surface is adjacent the existing accumulation of waste 20 (the lower sloped outer surface sits on at least a portion of the existing accumulation of waste), and the upper sloped outer surface is adjacent a future accumulation of waste 130 (at least a portion of the future accumulation of waste sits on the upper sloped outer surface). In the embodiments of FIGS. 2-3, a first liner portion 120 is disposed between the bottom surface and at least a portion of the edge surface and a second liner portion 122 is optionally disposed between the upper sloped outer surface and the future accumulation of waste 130. The liner portion disposed between the existing accumulation of waste 20 and the future accumulation of waste 130 is optional. The first and second liner portions will typically conform to Subtitle D of the Resource Conservation and Recovery Act (RCRA), conform to an approved equivalent of Subtitle D of RCRA (described in further detail below), or conform to a liner and/or cover system requirement of any appropriate regulatory agency. Embodiments of the invention may utilize any suitable liner and/or cover system. For simplicity, the liner portions of embodiments of the invention will be referred to herein as "Subtitle D or equivalent" liners or liner portions, however this is not intended to be limiting and embodiments of the invention are not limited to liners that conform to Subtitle D of RCRA or equivalents thereof. If the first and/or second liner portions comprise a Subtitle D or equivalent liner that has a geomembrane layer, the geomembrane that encapsulates the backfill material may function additionally as the geomembrane layer of the Subtitle D or equivalent liner. In other words, the geomembrane that encapsulates the backfill may perform double duty in that the geomembrane functions both as the encapsulating material and as a layer of the Subtitle D or equivalent liner.

In some embodiments of the invention, the Subtitle D or equivalent liner may be omitted and a geomembrane by itself used in place of the Subtitle D or equivalent liner if permitted by the appropriate governmental authorities. Advantageously, if a geomembrane is permitted to be used in place of the Subtitle D or equivalent liner, the geomembrane 114 that partially or fully encapsulates the backfill material will function as the replacement for the Subtitle D or equivalent liner and no additional liner is necessary (as above, the encapsulating geomembrane is performing two functions). The landfill of FIGS. 2 and 3 has a Subtitle D or equivalent liner 118 covering the surface of the waste-receiving recess, although embodiments of the invention may be used with a landfill that has no liner system in place.

Referring now to FIG. 3, a simplified cross-sectional diagram of a berm for increasing the capacity of an existing landfill is illustrated in accordance with an alternative embodiment of the present invention. The berm 142 of FIG.

3 comprises a reinforced portion 104 and backfill material 152. The reinforced portion 104 of FIG. 3 is identical to that of FIG. 2. The backfill material 152 is similar to that of FIG. 2 in that it comprises contaminated fill material, such as FFCPs or contaminated but non-hazardous soil. However, the backfill material of FIG. 3 is fully encapsulated by an impermeable membrane 144. Unlike the berm of FIG. 2, the portion 116 of the backfill material adjacent the existing waste accumulation is covered by an impermeable membrane 144 in FIG. 3.

Depending on the nature of the backfill material, it may be desirable to keep water from reaching the backfill material. This is why an impermeable membrane is used. However, liquid may be released from the backfill after placement. Therefore, it may be desirable to have an optional drainage system (commonly termed a "toe drain") within the encapsulation to drain away any water that is released from the backfill. The drainage system of FIG. 3 comprises a perforated pipe 154 running along at least a portion of the length of the berm. The pipe 154 is surrounded by a granular fill material 156. An optional plurality of drainage pipes (not illustrated) may each lead substantially perpendicularly from the perforated pipe to an area outside of the berm. The drainage pipes may either lead toward the face of the reinforced portion and exit the berm through the reinforced portion, or may lead toward the waste and exit the berm into the waste. The drainage pipes may ultimately lead to a collection tank for later management or may discharge into the landfill's leachate collection and treatment system. Each of the plurality of drainage pipes typically pass through the impermeable membrane via a corresponding boot that is joined to the impermeable membrane and to the corresponding drainage pipe with impermeable seams. A drainage layer 158 may be adjacent the inside surface of the lower sloped outer surface of the impermeable membrane, terminating on one side within the granular fill material. The drainage layer, which may comprise a geocomposite or any other suitable geosynthetic drainage media, helps channel any water toward the granular fill and the perforated pipe. The drainage system is an optional feature of all of the illustrated embodiments of the invention. The drainage system may vary significantly depending on the requirements of the specific implementation of the invention. For example, the drainage system may omit the plurality of drainage pipes. In such an embodiment, the perforated pipe may drain into a gravel conduit which may extend downward into the landfill.

Referring now to FIG. 4, a simplified cross-sectional diagram of a berm for increasing the capacity of an existing landfill is illustrated in accordance with an alternative embodiment of the present invention. The berm 162 of FIG. 4 is nearly identical to that of FIG. 3. However, the berm of FIG. 4 is illustrated being used with an existing unlined landfill, i.e., a landfill in which the surface 178 of the waste-receiving recess is not lined with a Subtitle D or equivalent liner. Additionally, a third liner portion 176 is disposed between the lower sloped outer surface and the existing accumulation of waste 20. The third liner portion may conform to Subtitle D of RCRA or conform to an approved equivalent of Subtitle D of RCRA. The landfill of FIG. 4 also has a Subtitle D or equivalent liner between the existing accumulation of waste 20 and the future accumulation of waste 130. As discussed above, if the liner portion comprises a Subtitle D or equivalent liner that has a geomembrane layer, the geomembrane that encapsulates the backfill material may function additionally as the geomembrane layer of the liner.

The first, second and/or third liner portions illustrated in the various figures are all optional. Embodiments of the present invention do not require and will not necessarily have or be used with a Subtitle D or equivalent liner.

Figure 5:
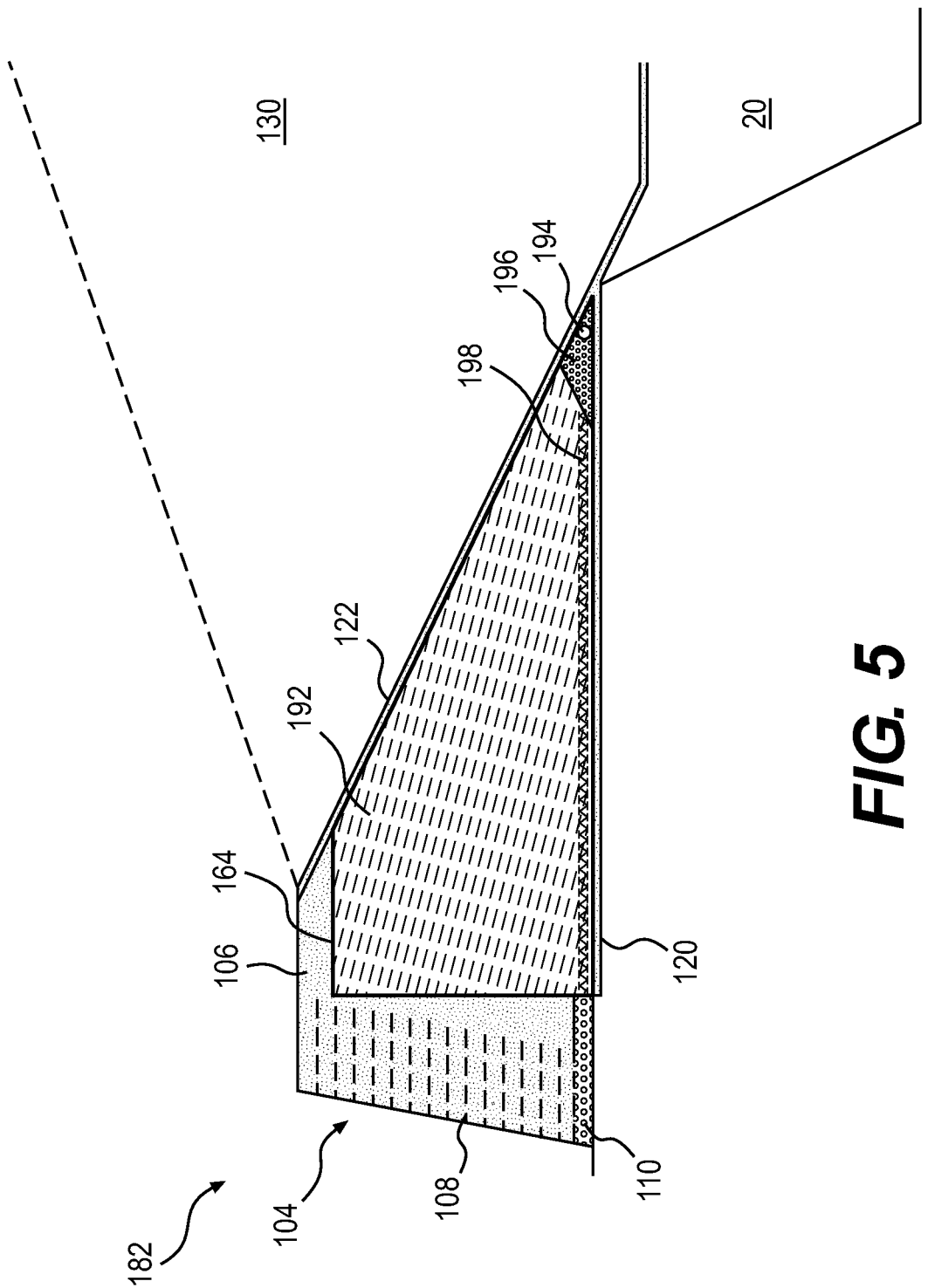
FIG. 5 is a simplified cross-sectional diagram of a berm for increasing the capacity of an existing landfill, in accordance with an alternative embodiment of the present invention.

Referring now to FIG. 5, a simplified cross-sectional diagram of a berm for increasing the capacity of an existing landfill is illustrated in accordance with an alternative embodiment of the present invention. The berm 182 of FIG. 2 comprises a reinforced portion 104 and backfill material 192. The reinforced portion 104 is identical to those of FIGS. 1-4. The backfill material 192 is similar to that of FIGS. 1-4 but with a different cross-sectional shape. The backfill material 192 of FIG. 5 is fully encapsulated by an impermeable membrane 164. As seen in FIG. 5, the berm 182 sits completely on the outer edge of the landfill and no part of the berm extends over the existing accumulation of waste 20.

The backfill material 192 of berm 182 comprises opposing top and bottom surfaces, and a sloped outer surface. The sloped outer surface slopes outward and downward from the top surface to the bottom surface. The sloped outer surface is adjacent a future accumulation of waste 130. In the embodiment of FIG. 5, a first liner portion 120 is disposed between the bottom surface and at least a portion of the edge surface and a second liner portion 122 is disposed between the sloped outer surface and the future accumulation of waste. The first and second liner portions, which are optional, may conform to Subtitle D of RCRA or conform to an approved equivalent of Subtitle D of RCRA.

The berm of FIG. 5 includes a drainage system which comprises a perforated pipe 194, running along at least a portion of the length of the berm. The pipe 194 is surrounded by a granular fill material 196. An optional plurality of drainage pipes (not illustrated) may each lead substantially perpendicularly from the perforated pipe toward the face and to an area outside of the berm. A drainage layer 198 is adjacent the inside surface of the bottom surface of the impermeable membrane, terminating on one side within the granular fill material. The drainage layer, which may comprise a geocomposite or any other suitable geosynthetic drainage media, helps channel any water toward the granular fill and the perforated pipe. In the embodiment of FIG. 5, the edge surface of the landfill on which the berm sits may be slightly sloped downward toward the waste-receiving recess to help facilitate the flow of any water toward the drainage system.

Figure 6:
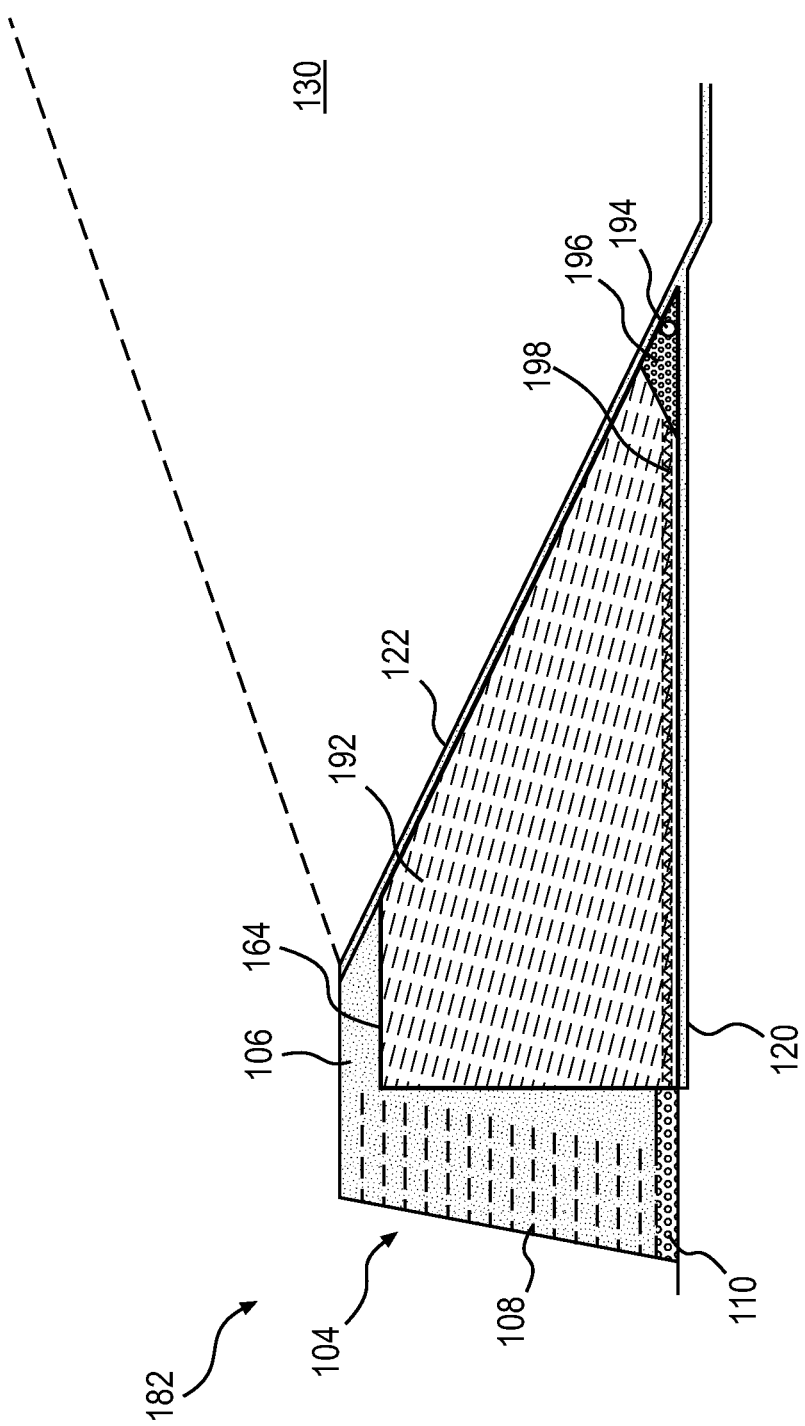
FIG. 6 is a simplified cross-sectional diagram of a berm for creating a new landfill or laterally increasing the capacity of an existing landfill, in accordance with an alternative embodiment of the present invention.

Referring now to FIG. 6, a simplified cross-sectional diagram of a berm for creating a new landfill or laterally increasing the capacity of an existing landfill is illustrated in accordance with an alternative embodiment of the present invention. The berm 182 of FIG. 6 is identical to that of FIG. 5, except that the berm 182 of FIG. 6 is not adjacent an existing accumulation of waste. Therefore, the berm of FIG. 6 may be used to create an entirely new landfill space—not expanding the capacity of existing landfill. Alternatively, the berm of FIG. 6 may be used to laterally increase the capacity of an existing landfill. In such an alternative use, the berm is situated laterally apart from the existing accumulation of waste, thereby enabling a new accumulation of waste to be placed between the berm and the existing accumulation of waste. Thus, the berm of FIG. 6 does not abut or surround any existing waste. The berm of FIG. 6 is situated to abut or surround a space at which a desired new landfill is to be located. The berm of FIG. 6 is used to create the waste-receiving recess into which a future accumulation of waste 130 is to be placed.

In embodiments of the invention illustrated in FIGS. 1-6, the inner surface of the reinforced portion and the adjacent inner surface of the backfill material are substantially planar. In alternative embodiments of the invention, illustrated in FIGS. 7-12, the inner surface of the reinforced portion and the adjacent inner surface of the backfill material are substantially non-planar. In such embodiments, the inner surface of the reinforced portion and the adjacent inner surface of the backfill material each comprise a plurality of interlocking sections, such as the zigzag configuration illustrated in FIGS. 7-12. The non-planar interlocking sections help facilitate construction of the berm.

Figure 7:
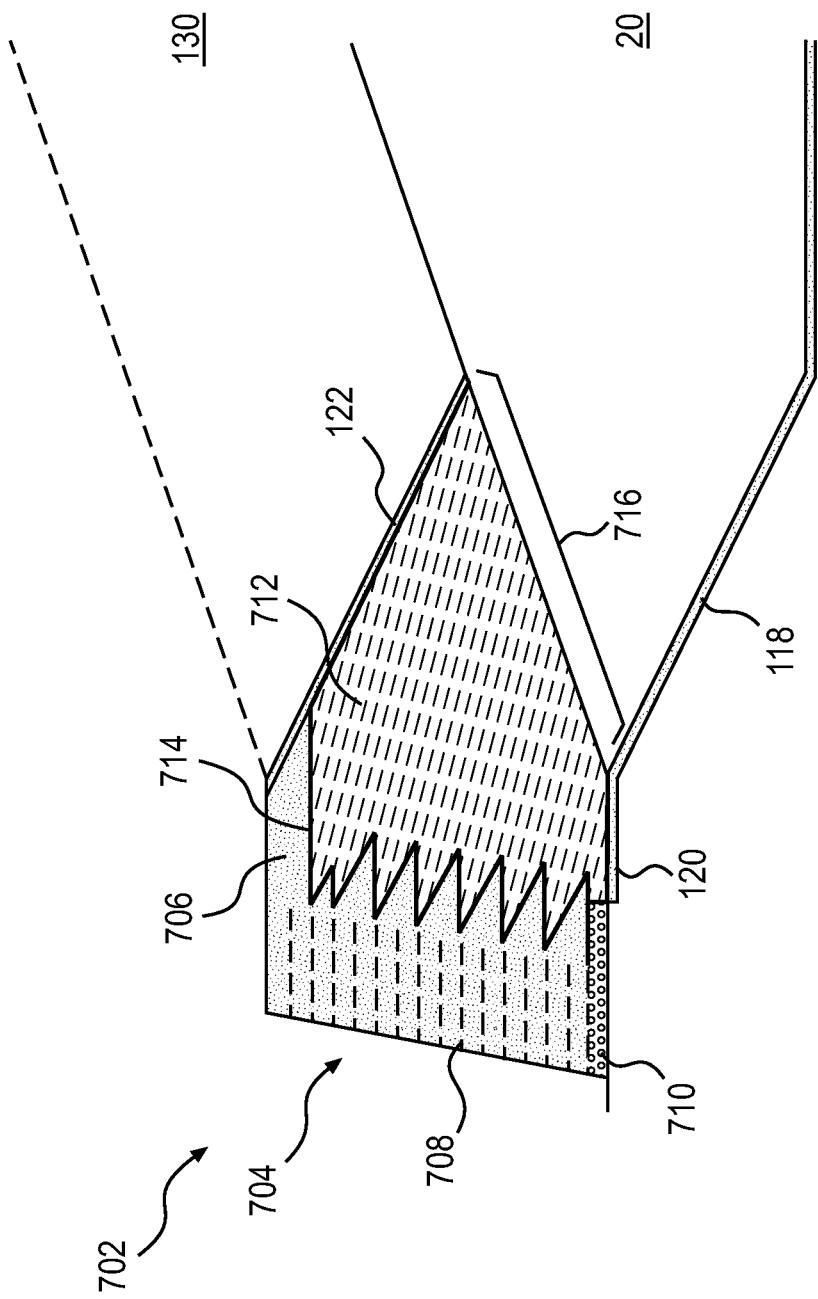
FIG. 7 is a simplified cross-sectional diagram of a berm for increasing the capacity of an existing landfill, in accordance with an alternative embodiment of the present invention.

Referring now to FIG. 7, a simplified cross-sectional diagram of a berm for increasing the capacity of an existing landfill is illustrated in accordance with an alternative embodiment of the present invention. The berm 702 of FIG. 7 is similar to the berm 102 of FIG. 2. However, in the berm 702 of FIG. 7, the inner surface of the reinforced portion and the adjacent inner surface of the backfill material each comprise a plurality of interlocking sections in a zigzag configuration. Berm 702 comprises a reinforced portion 704 and backfill material 712. The reinforced portion 704 is constructed using typical construction techniques and comprises structural fill material 706 and a plurality of reinforcing members 708 disposed therein. The reinforced portion may have a foundation of granular fill material 710. The backfill material 712 comprises contaminated fill material that is partially encapsulated by an impermeable membrane 714. In the embodiment of FIG. 7, the portion 716 of the backfill material adjacent the existing waste accumulation is not covered by an impermeable membrane. As in the berm of FIG. 2, the berm 702 has a lower sloped outer surface adjacent the existing accumulation of waste 20 (the lower sloped outer surface sits on at least a portion of the existing accumulation of waste), and a upper sloped outer surface adjacent a future accumulation of waste 130 (at least a portion of the future accumulation of waste sits on the upper sloped outer surface). Also, a liner portion 120 is disposed between the bottom surface and at least a portion of the edge surface and a second liner portion 122 is disposed between the upper sloped outer surface and the future accumulation of waste 130. Liner 118 covers the surface of the waste-receiving recess.

Figure 8:
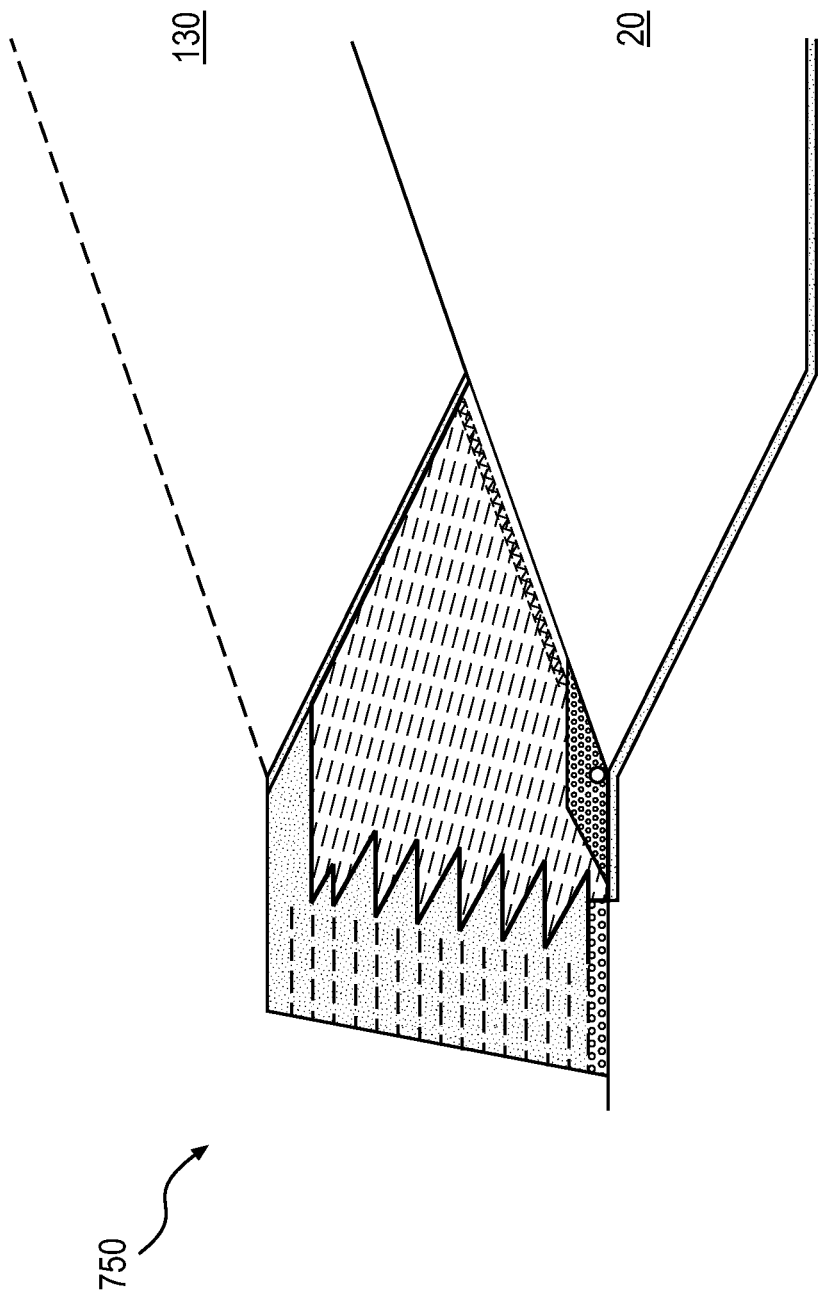
FIG. 8 is a simplified cross-sectional diagram of a berm for increasing the capacity of an existing landfill, in accordance with an alternative embodiment of the present invention.

Referring now to FIG. 8, a simplified cross-sectional diagram of a berm for increasing the capacity of an existing landfill is illustrated in accordance with an alternative embodiment of the present invention. The berm 750 of FIG. 8 is similar to the berm 142 of FIG. 3. However, in the berm 750 of FIG. 8, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 750 of FIG. 8 are the same as the corresponding components of berm 142 of FIG. 3.

Figure 9:
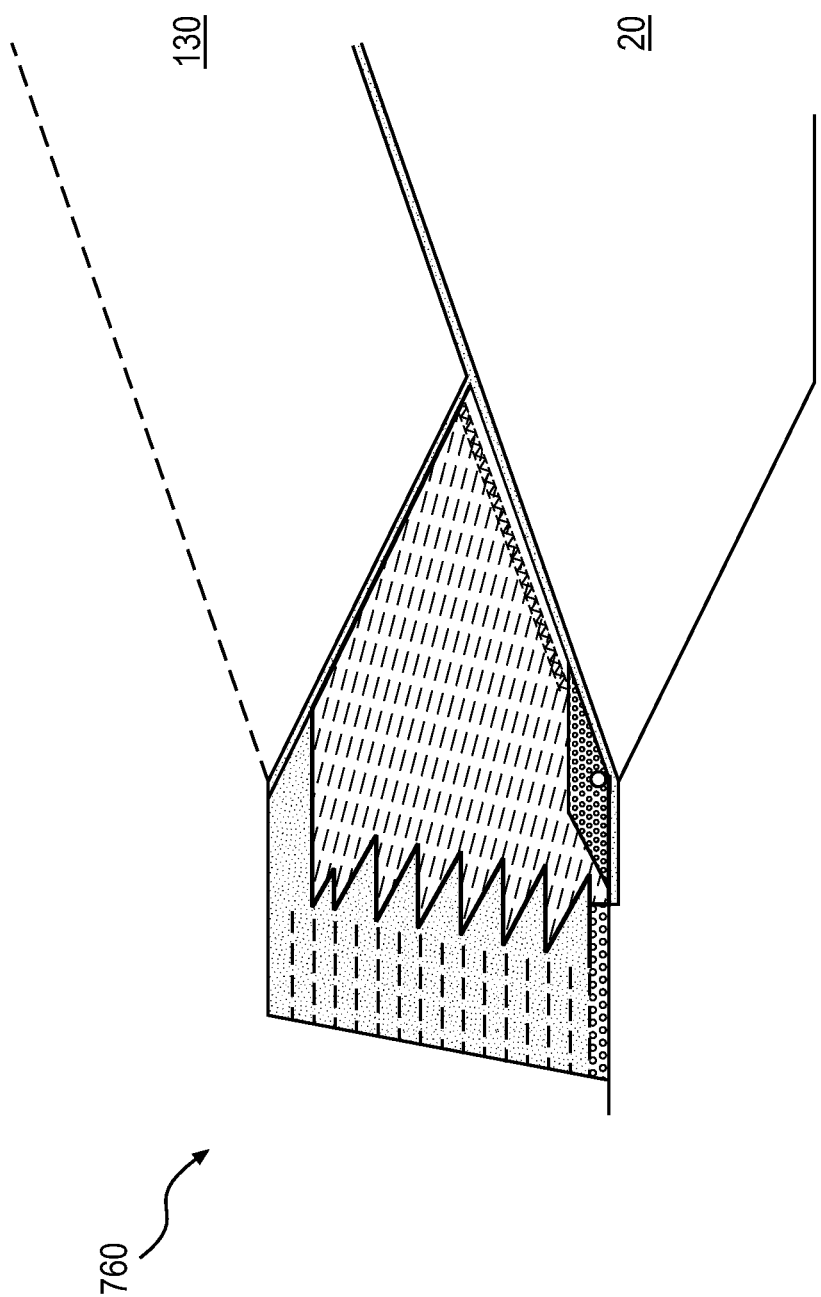
FIG. 9 is a simplified cross-sectional diagram of a berm for increasing the capacity of an existing landfill, in accordance with an alternative embodiment of the present invention.

Referring now to FIG. 9, a simplified cross-sectional diagram of a berm for increasing the capacity of an existing landfill is illustrated in accordance with an alternative embodiment of the present invention. The berm 760 of FIG. 9 is similar to the berm 162 of FIG. 4. However, in the berm 760 of FIG. 9, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 760 of FIG. 9 are the same as the corresponding components of berm 162 of FIG. 4.

Figure 10:
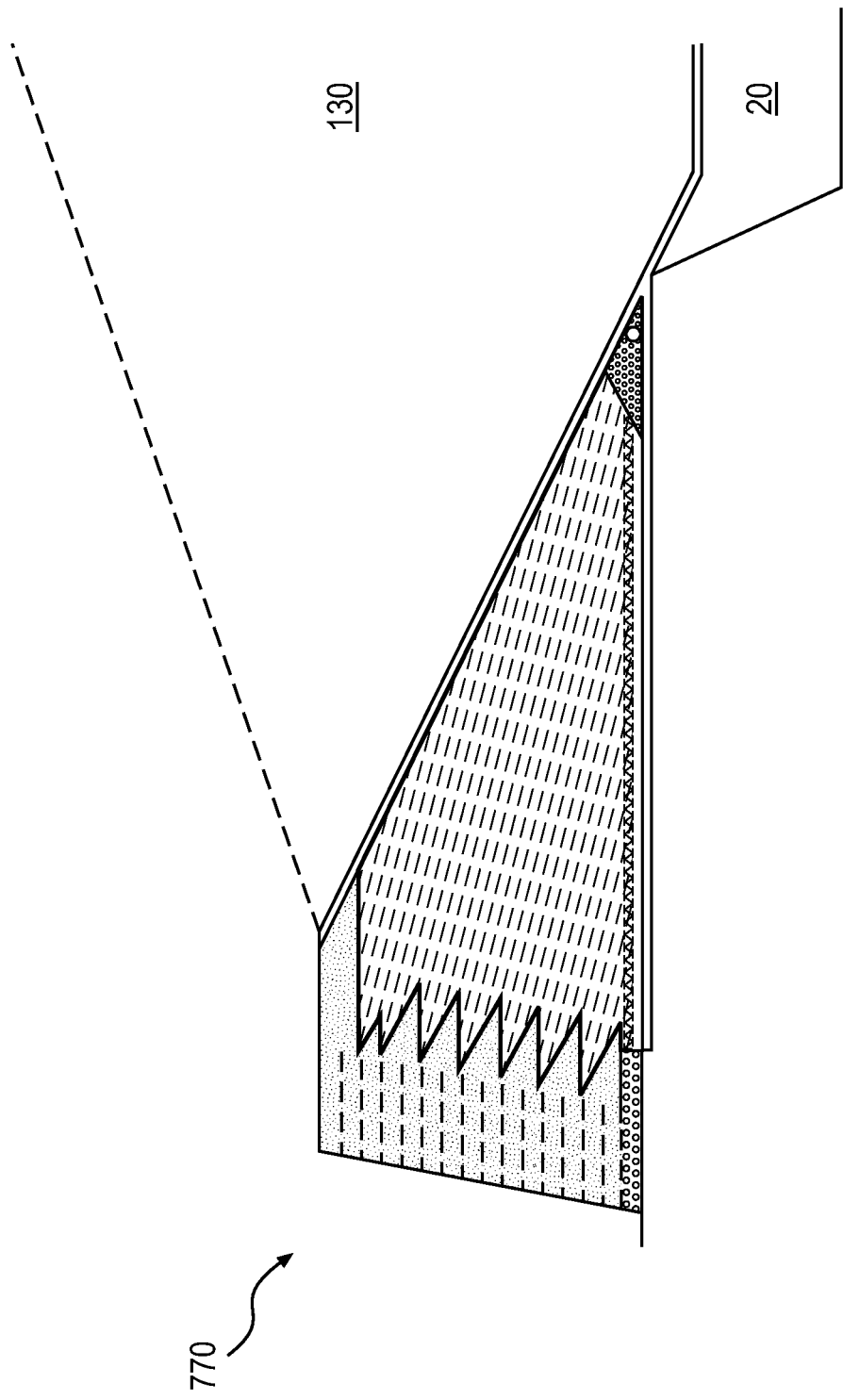
FIG. 10 is a simplified cross-sectional diagram of a berm for increasing the capacity of an existing landfill, in accordance with an alternative embodiment of the present invention.

Referring now to FIG. 10, a simplified cross-sectional diagram of a berm for increasing the capacity of an existing landfill is illustrated in accordance with an alternative embodiment of the present invention. The berm 770 of FIG. 10 is similar to the berm 182 of FIG. 5. However, in the berm 770 of FIG. 10, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 770 of FIG. 10 are the same as the corresponding components of berm 182 of FIG. 5.

Figure 11:
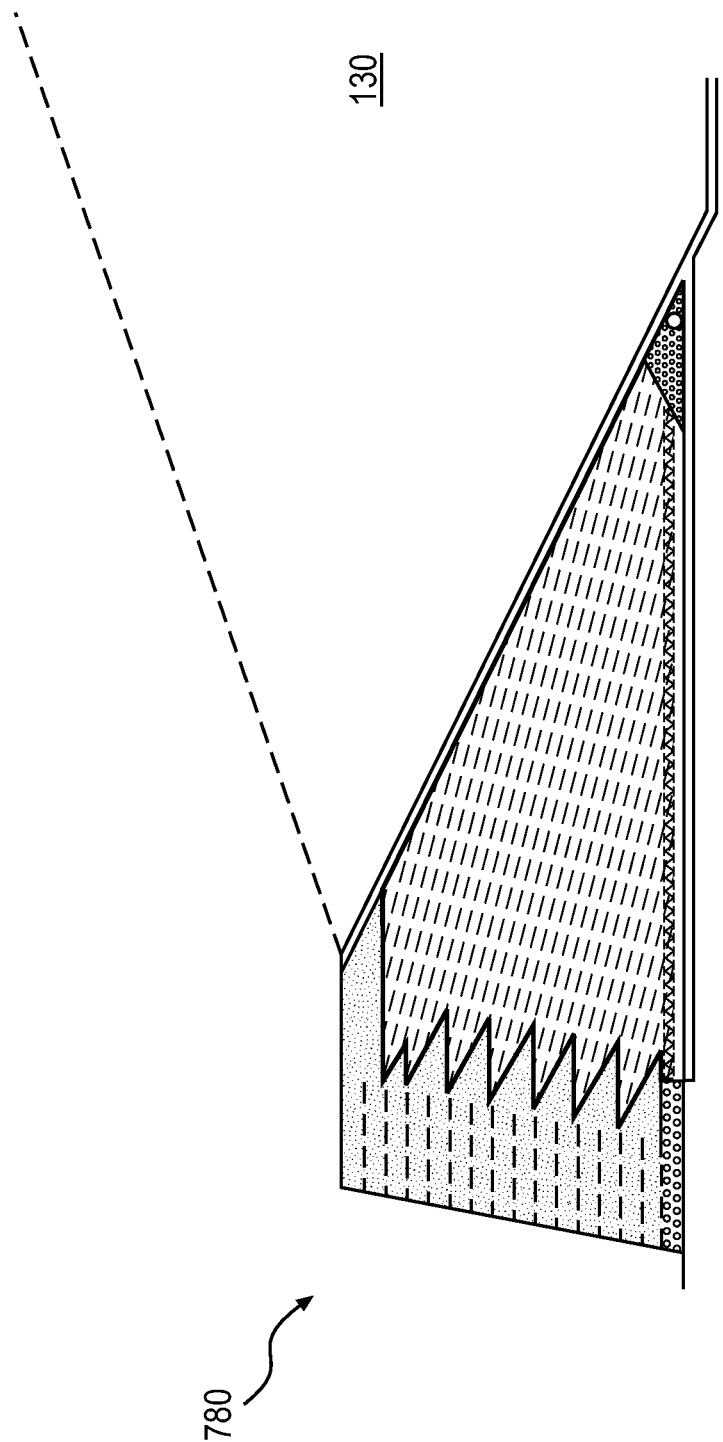
FIG. 11 is a simplified cross-sectional diagram of a berm for creating a landfill or laterally increasing the capacity of an existing landfill, in accordance with an alternative embodiment of the present invention.

Referring now to FIG. 11, a simplified cross-sectional diagram of a berm for creating a new landfill or laterally increasing the capacity of an existing landfill is illustrated in accordance with an alternative embodiment of the present invention. The berm 780 of FIG. 11 is similar to the berm 182 of FIG. 6. However, in the berm 780 of FIG. 11, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 780 of FIG. 11 are the same as the corresponding components of berm 182 of FIG. 6.

Figure 12:
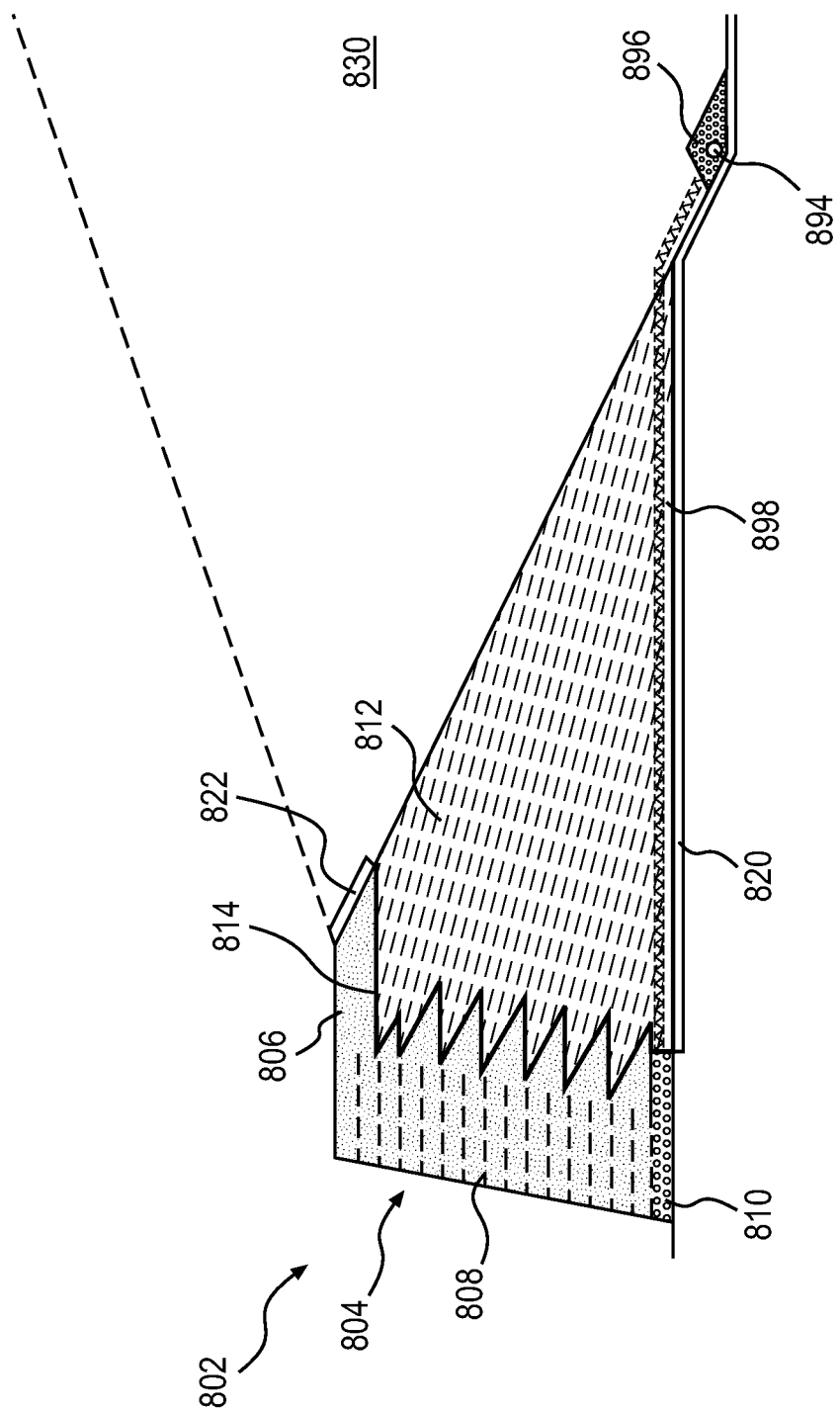
FIG. 12 is a simplified cross-sectional diagram of a berm for creating a landfill, in accordance with an alternative embodiment of the present invention.

Referring now to FIG. 12, a simplified cross-sectional diagram of a berm for increasing the capacity of an existing landfill or creating a new landfill is illustrated in accordance with an alternative embodiment of the present invention. Berm 802 of FIG. 12 is similar to berm 182 of FIG. 6, in that the berm of FIG. 12 is illustrated creating an entirely new landfill space—not expanding the capacity of existing landfill. The berm of FIG. 12 does not abut or surround any existing waste. The berm of FIG. 12 is situated to abut or surround a space at which a desired new landfill is to be located. The berm of FIG. 12 is used to create the waste-receiving recess into which a future accumulation of waste 830 is to be placed. Berm 802 of FIG. 12 will be particularly useful for expansion or creation of a landfill in which the waste 830 is FFCPs. In such a FFCP landfill, the backfill material 812 may comprise the same waste material as is disposed of in the landfill. Berm 802 comprises a reinforced portion 804 and backfill material 812. The reinforced portion 804 is constructed using typical construction techniques and comprises structural fill material 806 and a plurality of reinforcing members 808 disposed therein. The reinforced portion may have a foundation of granular fill material 810. The backfill material 812 comprises contaminated fill material that is partially encapsulated by an impermeable membrane 814. In the embodiment of FIG. 12, the portion of the backfill material adjacent the waste accumulation 830 is not covered by an impermeable membrane. As in the berm of FIG. 6, the berm 802 has a sloped outer surface adjacent a future accumulation of waste 830. Also, a liner portion 820 is disposed between the bottom surface and at least a portion of the edge surface and the liner portion 820 also covers the surface of the waste-receiving recess. A liner portion 822 may be disposed between the future accumulation of waste 830 and the reinforced portion 804. Liner portion 820 and liner portion 822 may be a subtitle D liner or equivalent thereof. A drainage system is situated partially within the berm of FIG. 12 and partially within the landfill recess. The drainage system comprises a perforated pipe 894, running along a low point of the landfill recess. The pipe 894 is surrounded by a granular fill material 896. In this embodiment, the portion of the drainage system within the landfill recess may comprise the landfill leachate collection system. A drainage layer 898 is partially within the backfill material (adjacent the inside surface of the bottom surface of the impermeable membrane) and partially within the landfill recess, terminating on one side within the granular fill material. The drainage layer, which may comprise a geocomposite, helps channel any water toward the granular fill and the perforated pipe.

Figure 13:
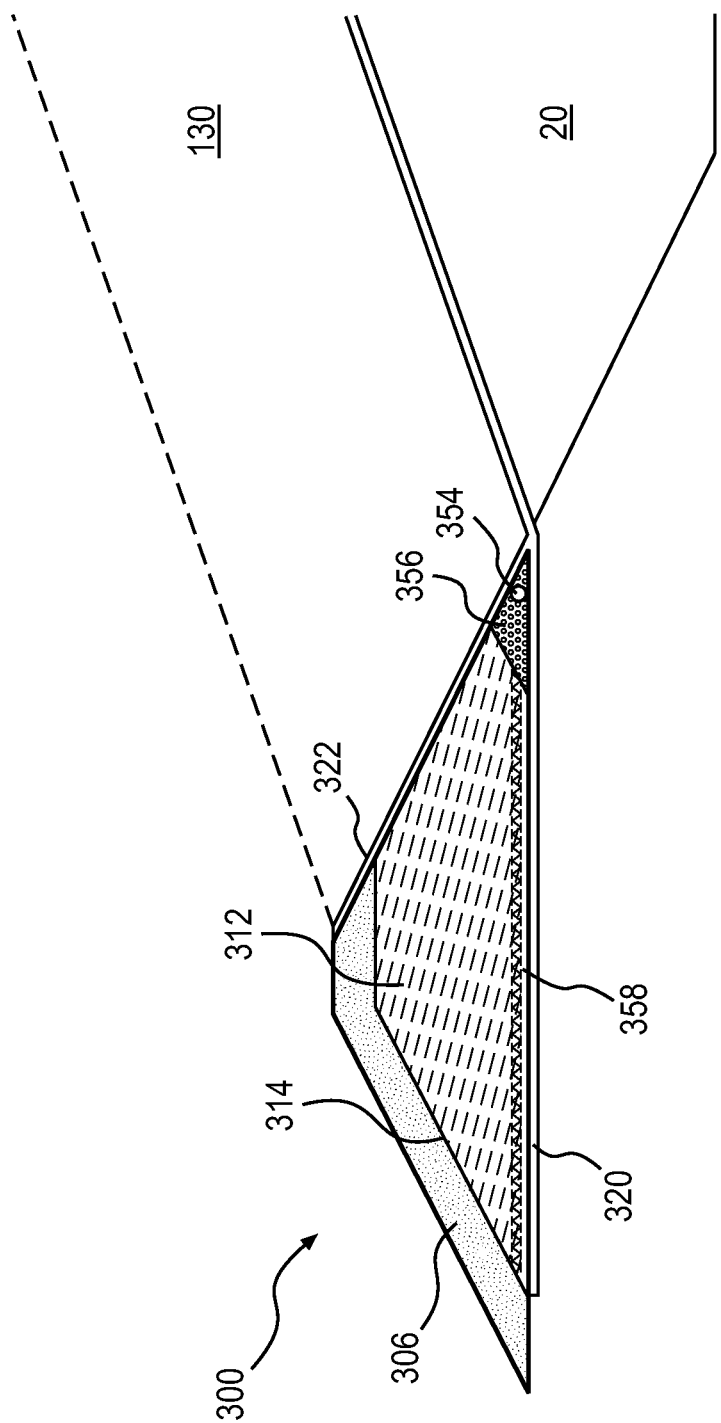
FIG. 13 is a simplified cross-sectional diagram of a berm for increasing the capacity of an existing landfill, in accordance with an alternative embodiment of the present invention.
Figure 14:
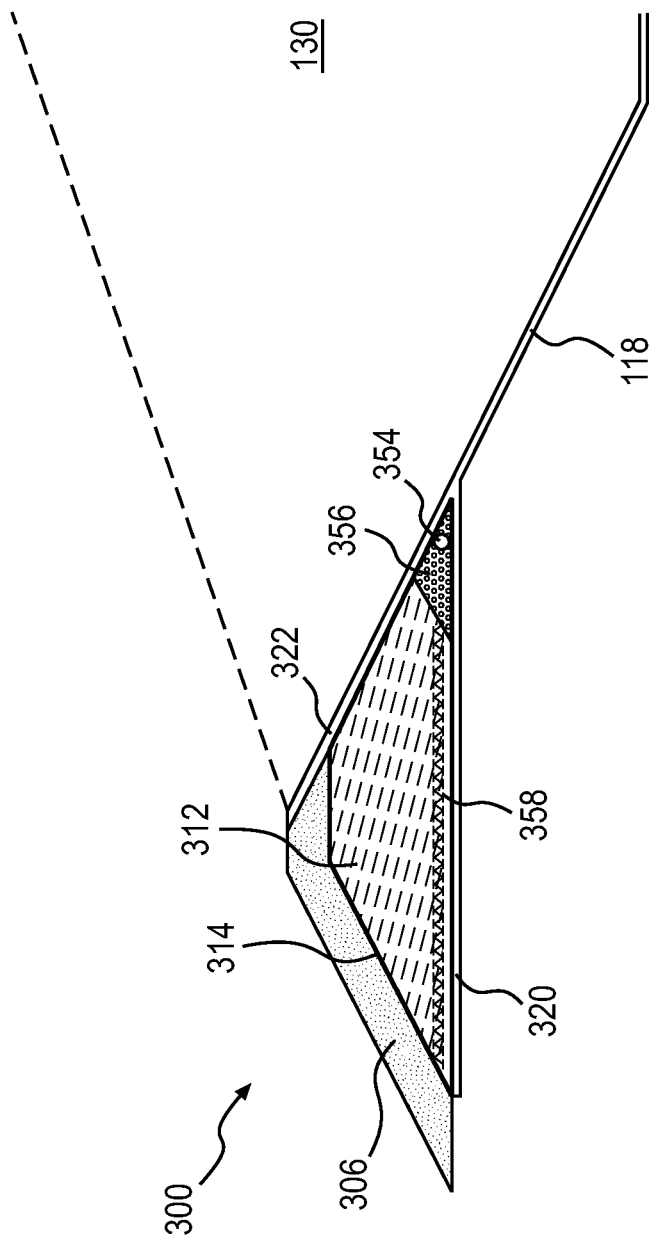
FIG. 14 is a simplified cross-sectional diagram of a berm for creating a landfill or laterally increasing the capacity of an existing landfill, in accordance with an alternative embodiment of the present invention.
Figure 15:
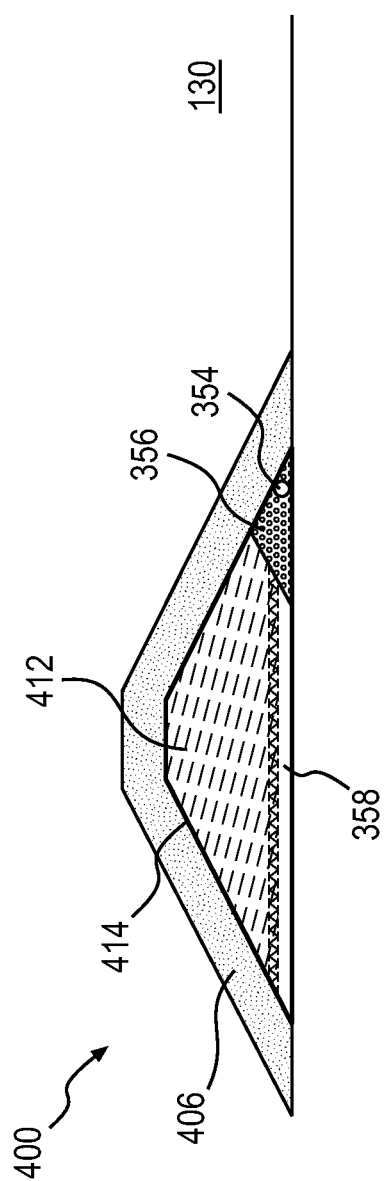
FIG. 15 is a simplified cross-sectional diagram of a berm, in accordance with an alternative embodiment of the present invention.

FIGS. 13-15 illustrate berms of alternative embodiments of the invention. The berms of FIGS. 13-15 function similarly to the berms of FIGS. 1-12 in that the berms of FIGS. 13-15 can be used to increase the capacity of an existing landfill. However, the berms of FIG. 13-15 have a different cross-sectional shape than the berms of FIGS. 1-12. Additionally, the berms of FIG. 13-15 do not have a reinforced portion, although the berms of FIGS. 13-15 have structural fill that could optionally be reinforced in a manner similar to that of the reinforced portions of the berms of FIGS. 2-12 or in any suitable manner. The berms of FIGS. 13-15 have an overall cross-sectional shape that is substantially an equilateral trapezoid. Additionally, the backfill material of the berms of FIGS. 13-15 has a cross-sectional shape that is substantially an equilateral trapezoid. The backfill material of the berms of FIGS. 13-15 is fully encapsulated by an impermeable membrane.

Referring now to FIG. 13, a simplified cross-sectional diagram of a berm for increasing the capacity of an existing landfill is illustrated in accordance with an alternative embodiment of the present invention. The berm 300 of FIG. 13 comprises backfill material 312 fully encapsulated by an impermeable membrane 314 (such as a geomembrane as described above). The sloped front face (the surface opposite the waste) and the top surface of the backfill material are covered by a protective covering 306 of structural fill material. A plurality of reinforcing members 308 may optionally be disposed therein. The berm sits on the edge surface of the landfill, thereby creating space for a future accumulation of waste 130 above the existing accumulation of waste 20. The berms of FIGS. 13-15 may have an optional drainage system similar to that of the berms of FIGS. 3-6 (the drainage system is an optional feature of all of the berms). The drainage system of the berm of FIG. 13 comprises a perforated pipe 354 running along at least a portion of the length of the berm. The pipe 354 is surrounded by a granular fill material 356. An optional plurality of drainage pipes (not illustrated) may each lead substantially perpendicularly from the perforated pipe toward the face and to an area outside of the berm. Each of the plurality of drainage pipes typically pass through the impermeable membrane via a corresponding boot that is joined to the impermeable membrane and to the corresponding drainage pipe with impermeable seams. A drainage layer 358 may be adjacent the inside surface of the lower sloped outer surface of the impermeable membrane, terminating on one side within the granular fill material. The drainage layer, which may comprise a geocomposite or any other suitable geosynthetic drainage media, helps channel any water toward the granular fill and the perforated pipe.

In the embodiment of FIG. 13, a first liner portion 320 is disposed between the bottom surface and at least a portion of the edge surface and a second liner portion 322 is disposed between the berm and the future accumulation of waste 130. The first and second liner portions will typically conform to Subtitle D of RCRA or conform to an approved equivalent of Subtitle D of RCRA. As discussed above, if the first and/or second liner portions comprise a Subtitle D or equivalent liner that has a geomembrane layer, the geomembrane that encapsulates the backfill material may function additionally as the geomembrane layer of the Subtitle D or equivalent liner. Also as discussed above, the Subtitle D or equivalent liner may be omitted and a geomembrane by itself used in place of the Subtitle D or equivalent liner if permitted by the appropriate governmental authorities. The embodiments of FIGS. 13-15 may be used with a landfill with no liner system in place (see FIG. 13) or with a landfill that has a Subtitle D or equivalent liner 118 covering the surface of the waste-receiving recess (see FIG. 14).

A berm according to embodiments of the present invention may be used to create a new landfill by constructing one or more such berms around the desired perimeter of the new landfill. In such an alternative embodiment, the one or more berms define and create the waste-receiving recess of the landfill. This is illustrated in FIGS. 14 and 15. FIG. 14 illustrates a berm situated adjacent a hole in the ground such that the berm increases the effective size of the waste-receiving recess. The berm of FIG. 14 may be useful if conditions at the landfill location prevent the hole from being dug deep enough to create a desired sized recess. FIG. 15 illustrates a berm situated adjacent a substantially horizontal ground surface such that the berm creates/defines the entire waste-receiving recess. The berm of FIG. 15 may be useful if conditions at the landfill location prevent any hole from being dug to create the desired recess.

Referring now to FIG. 14, a simplified cross-sectional diagram of a berm for creating a landfill or laterally increasing the capacity of an existing landfill is illustrated in accordance with an alternative embodiment of the present invention. The berm of FIG. 14 is identical to that of FIG. 13 except that the berm of FIG. 14 is being used to create a new landfill or laterally expand an existing landfill. Thus, the berm of FIG. 14 is not situated adjacent an existing accumulation of waste but rather is situated adjacent an empty recess or laterally apart from an existing accumulation of waste.

Referring now to FIG. 15, a simplified cross-sectional diagram of a berm is illustrated in accordance with an alternative embodiment of the present invention. The berm 400 of FIG. 15 may be used, for example, as a roadway embankment. The berm 400 of FIG. 15 is similar to that of FIGS. 13 and 14, but the backfill material 312 of the berm 400 of FIG. 15 is covered by a protective covering 406 of structural fill material on the top surface and both sloped surfaces. As in the berms of FIGS. 13 and 14, the structural fill material of the berm of FIG. 15 may have a plurality of reinforcing members 308 optionally disposed therein.

In addition to use for increasing the capacity of an existing landfill or creating a new landfill, the berms of embodiments of the invention may be used for any purpose typically accomplished by prior art berms. For example, the berms of embodiments of the invention may be used for roadway barriers or levees. The berm 400 of FIG. 15 may be particularly suited for non-landfill purposes, such as for creating a levee.

Some or all of the protective covering of any of the berms of FIGS. 13-15 may be topped with concrete or any other suitable material to increase the structural strength of the berm and/or to help maintain the structural fill material in place.

Figure 16:
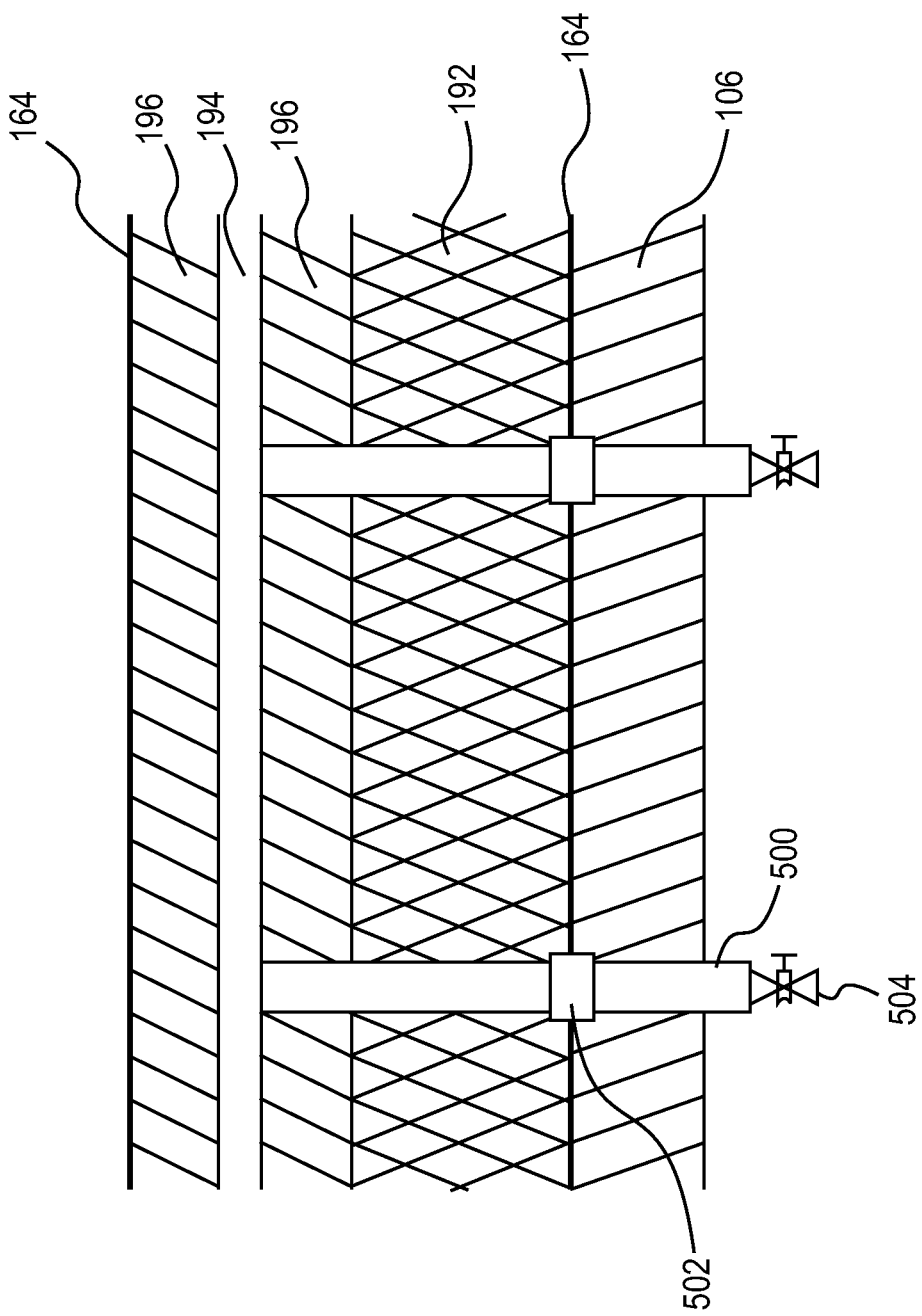
FIG. 16 is a partial top cutaway view of a drainage system of a berm for increasing the capacity of an existing landfill, in accordance with embodiments of the present invention.

Referring now to FIG. 16, a partial top cutaway view of an optional drainage system of a berm is illustrated in accordance with embodiments of the present invention. FIG.

16 illustrates one possible embodiment of the drainage system of the berm of FIG. 5, however the drainage systems of the other illustrated berms of embodiments of the invention may be similar to that illustrated in FIG. 16. Many different drainage system configurations may be used in various embodiments of the invention. FIG. 16 illustrates the perforated pipe 194 running along the length of the berm within the impermeable membrane 164. The perforated pipe is surrounded by a granular fill material 196. A plurality of drainage pipes 500 (two are illustrated) each lead substantially perpendicularly from the perforated pipe toward the face through the backfill material 192 and the structural fill 106 and to an area outside of the berm. Each of the plurality of drainage pipes typically exits the impermeable membrane through a corresponding boot 502 that is joined to the impermeable membrane and to the corresponding drainage pipe with impermeable seams. The terminal end of each drainage pipe will typically have a valve 504 to control the flow of any infiltrated water out of the drainage system. Additionally or alternatively, fluid monitoring devices may be placed at the terminal end of each drainage pipe.

FIGS. 17A-C illustrate simplified partial cross-sectional diagrams of a Subtitle D landfill liner and two equivalents thereof. FIG. 17A illustrates the layers of a Subtitle D liner. Layer 600 is the subgrade. Layer 602 is two feet of clay with a specified permeability. Layer 604 is a geomembrane (typically a 60 mil HDPE geomembrane). Layer 606 is eighteen inches of coarse granular material (e.g., aggregate or sand). FIG. 17B illustrates the layers of a liner that is typically considered to be equivalent to a Subtitle D liner. Layer 600 is the subgrade. Layer 608 is a geosynthetic clay liner (GCL). Layer 610 is a geomembrane (typically a 60 mil HDPE geomembrane). Layer 612 is either a geocomposite or eighteen inches of coarse granular material (e.g., aggregate or sand). FIG. 17C illustrates the layers of a liner that is typically considered to be equivalent to a Subtitle D liner. Layer 600 is the subgrade. Layer 608 is a geomembrane laminated geosynthetic clay liner. Layer 616 is either a geocomposite or eighteen inches of coarse granular material (e.g., aggregate or sand).

FIGS. 18, 19 and 20 each illustrate a simplified cross-sectional diagram of a berm in accordance with alternative embodiments of the present invention. The berms of FIGS. 18, 19 and 20 are similar, respectively, to the berms of FIGS. 13, 14 and 15. However, the berms of FIGS. 18, 19 and 20 have a backfill material that has a pyramidal (rather than frusto-pyramidal) cross-sectional shape. Referring now to FIG. 18, a simplified cross-sectional diagram of a berm for increasing the capacity of an existing landfill is illustrated in accordance with an alternative embodiment of the present invention. The berm 700 of FIG. 18 comprises pyramidal (rather than frusto-pyramidal) backfill material 712 fully encapsulated by an impermeable membrane 314 (such as a geomembrane as described above). The sloped front face (the surface opposite the waste) of the backfill material is covered by a protective covering 306 of structural fill material. In all other respects, the berm of FIG. 18 is the same as the berm of FIG. 13.

Referring now to FIG. 19, a simplified cross-sectional diagram of a berm for creating a landfill or laterally increasing the capacity of an existing landfill is illustrated in accordance with an alternative embodiment of the present invention. The berm of FIG. 19 is identical to that of FIG. 18 except that the berm of FIG. 19 is being used to create a new landfill or laterally expand an existing landfill. Thus, the berm of FIG. 19 is not situated adjacent an existing accumulation of waste but rather is situated adjacent an empty recess or laterally apart from an existing accumulation of waste. The berm 700 of FIG. 19 comprises pyramidal (rather than frusto-pyramidal) backfill material 712 fully encapsulated by an impermeable membrane 314 (such as a geomembrane as described above). The sloped front face (the surface opposite the waste) of the backfill material is covered by a protective covering 306 of structural fill material. In all other respects, the berm of FIG. 19 is the same as the berm of FIG. 14.

Referring now to FIG. 20, a simplified cross-sectional diagram of a berm for creating a landfill or laterally increasing the capacity of an existing landfill is illustrated in accordance with an alternative embodiment of the present invention. The berm 800 of FIG. 20 comprises pyramidal (rather than frusto-pyramidal) backfill material 812 fully encapsulated by an impermeable membrane 414 (such as a geomembrane as described above). The sloped front face (the surface opposite the waste) and the sloped back face (the surface adjacent the future accumulation of waste) of the backfill material is covered by a protective covering 406 of structural fill material. In all other respects, the berm of FIG. 20 is the same as the berm of FIG. 15. As with the berm of FIG. 15, the berm 800 of FIG. 20 may be particularly suited for non-landfill purposes, such as for creating a levee.

Some or all of the protective covering of any of the berms of FIGS. 18-20 may be topped with concrete or any other suitable material to increase the structural strength of the berm and/or to help maintain the structural fill material in place.

The apices of the pyramidal cross-section of the backfill material of FIGS. 18, 19 and 20 are illustrated as being generally pointed. However, in alternative embodiments of the inventions, the apices of the pyramidal cross-section of the backfill material of FIGS. 18, 19 and 20 may be generally rounded.

Referring now to FIG. 21, a simplified cross-sectional diagram of a berm for increasing the capacity of an existing landfill is illustrated in accordance with an alternative embodiment of the present invention. The berm 852 of FIG. 21 is similar to that of FIG. 4. However, in the berm of FIG. 21, impermeable membrane 860 encapsulates more than just the backfill material 152. Specifically, impermeable membrane 860 also encapsulates at least a portion of the fill material 856 that is used to create the reinforced portion 854. As illustrated in FIG. 21 and as described in more detail above, the reinforced portion 854 comprises a plurality of reinforcing members 858 disposed (typically horizontally) therein. As illustrated in FIG. 21 and in more detail in FIG. 23, the reinforcing members 858 extend from and are typically attached to or integral with the wall-facing material. As such, the impermeable membrane 860 cannot simply be placed substantially vertically adjacent the face of the reinforced portion, as the reinforcing members obstruct an uninterrupted placement of the membrane. Therefore, the portion of the membrane adjacent the face of the reinforced portion comprises multiple segments that each span from one reinforcing member to an adjacent reinforcing member, as described in more detail below relative to FIG. 23. The impermeable membrane thereby at least partially encapsulates at least a portion of one or more reinforcing members.

The berm of FIG. 21 may further comprise a column 862 of granular material or geosynthetic drain (e.g., Geocomposite, etc.) to help drain any moisture that may be present in the fill material 856. Such a granular column may be especially helpful if the fill material comprises a fine-grained material that does not shed moisture well. Such a granular column may not be needed if the fill material comprises a sufficiently coarse-grained material. The granular column in FIG. 21 is illustrated as planar and substantially vertical, although alternative embodiments of the invention may utilize non-planar columns and/or columns that are other than substantially vertical.

Referring now to FIG. 22, a simplified cross-sectional diagram of a berm for creating a landfill or increasing the capacity of an existing landfill is illustrated in accordance with an alternative embodiment of the present invention. The berm 902 of FIG. 22 is similar to that of FIG. 5. However, in the berm of FIG. 22 (as in the berm of FIG. 21), impermeable membrane 910 encapsulates more than just the backfill material 192. Specifically, impermeable membrane 910 also encapsulates at least a portion of the fill material 906 that is used to create the reinforced portion 904. As in FIG. 21, the reinforced portion 904 of FIG. 22 comprises a plurality of reinforcing members 908 disposed (typically horizontally) therein, and the portion of the membrane adjacent the face of the reinforced portion comprises multiple segments that each span from one reinforcing member to an adjacent reinforcing member, as described in more detail below relative to FIG. 23. The impermeable membrane thereby at least partially encapsulates at least a portion of one or more reinforcing members. As in FIG. 21, the berm of FIG. 22 may further comprise a column 912 of granular material to help drain any moisture that may be present in the fill material 906. Such a granular column may not be needed if the fill material comprises a sufficiently coarse-grained material. The granular column in FIG. 22 is illustrated as planar and substantially vertical, although alternative embodiments of the invention may utilize non-planar columns and/or columns that are other than substantially vertical.

Referring now to FIG. 23, a simplified cross-sectional diagram of a portion of the berm of FIG. 21 is illustrated. The corresponding components of the berm of FIG. 22 may also be configured as illustrated in FIG. 23. The berm portion of FIG. 23 comprises two wall-facing components 870a, 870b (e.g., wire baskets), corresponding reinforcing members 858a, 858b, and impermeable membrane 860 (comprising three portions—860a, 860b and 860c). The reinforcing members typically comprise one or more transverse bars 864a, 864b along their lengths. The transverse bars may be larger and more substantial than the remainder of the reinforcing members.

The top portion 860a of the impermeable membrane extends from the backfill material (not illustrated, but off the right side of FIG. 23, and illustrated in FIGS. 21 and 22) into the reinforced portion and is impermeably affixed to one of the reinforcing members. The top portion 860a of the impermeable membrane will typically extend into the reinforced portion at or about the level of one of the reinforcing members and be impermeably affixed to that nearest member. The portion of the impermeable membrane off the right side of FIG. 23 forms the top portion of the impermeable membrane 860 shown in FIG. 21. In FIG. 23, the top portion 860a of the impermeable membrane is impermeably affixed to member 858a. The top portion 860a of the impermeable membrane is impermeably affixed to member 858a using any suitable technique, including but not limited to gluing, extrusion welding, solvent welding, or fusion welding, thereby creating an impermeable joint 872.

To continue the impermeable membrane vertically (or substantially vertically) along the inner surface of the face of the reinforcing portion, a relatively narrow section 860b of impermeable membrane is affixed on one side (the top side) to the underside of reinforcing member 858a and on the other side (the bottom side) to the top side of reinforcing member 858b to span the gap between the two reinforcing members and to create an impermeable barrier across that gap. The narrow section 860b of the impermeable membrane is impermeably affixed to member 858a and 858b using any suitable technique, including but not limited to gluing, extrusion welding, solvent welding, or fusion welding, thereby creating two impermeable joints 872.

Another relatively narrow section 860c may be affixed to the underside of reinforcing member 858b and to another reinforcing member (not illustrated) below reinforcing member 858b. This spanning of gaps between two adjacent reinforcing members may continue along the entire height of the wall, or along as much of the height of the wall as desired, to create the vertical or near vertical portion of the impermeable encapsulation. At the bottom of the vertical or near vertical portion of the impermeable encapsulation (not illustrated), a bottom portion of the impermeable membrane will extend back toward the backfill material as illustrated in FIGS. 21 and 22.

Although it is not illustrated in FIG. 23 because FIG. 23 is a cross-section, it will be appreciated that the illustrated sections of the impermeable membrane extend a substantial distance along the length of the berm (and possibly along the entire length) to effectively encapsulate much or all of the backfill material and a significant portion of the fill material.

The vertical (or substantially vertical) portion of the impermeable membrane may be positioned any desired distance from the inner surface of the face of the reinforced portion, although a distance of 2-4 feet may be desirable.

FIGS. 21 and 22 illustrate specific embodiments in which the impermeable membrane encapsulates a portion of the fill material and (potentially) a portion of one or more of the reinforcing members. It should be appreciated that any specific embodiment of the invention (including but not limited to any embodiments specifically described and/or illustrated herein) may comprise an impermeable membrane that encapsulates a portion of the fill material and (potentially) a portion of one or more of the reinforcing members. For example, specific concepts of embodiments of the invention illustrated in FIGS. 21 and 22 would work equally well in the berms of FIGS. 2-15 and 18-20, and such berms are within the scope of the invention and this application. Further, embodiments of the invention in which the impermeable membrane encapsulates a portion of the fill material and (potentially) a portion of one or more of the reinforcing members include embodiments in which the impermeable membrane encapsulates (a) some portion of one reinforcing member, (b) some portion of two or more reinforcing members, (c) all of one reinforcing member, or (d) all of two or more reinforcing members.

In all embodiments of the invention, the fill material used to create the reinforced portion (e.g., fill material 106 used to create reinforced portion 104 of FIG. 4) may comprise clean structural fill or may comprise contaminated soil/media, provided the contaminated soil/media can be amended or manipulated to meet the parameters provided by a design engineer and can meet regulatory approval.

Construction of a berm according to embodiments of the invention generally begins with site improvements, infrastructure relocation, and subgrade preparation. Depending on site conditions, improvements of leachate and/or gas collection systems may be required prior to construction of the berm. Decommissioning and/or relocation of monitoring wells, gas probes, water/sewer lines, communications and/or electricity cables, stormwater features, and other appurtenances may be necessary. This work will generally be performed prior to subgrade preparation. The existing subgrade along the berm footprint may require cut/fill in order to bring existing grades to the proposed base grade elevations, as specified in the construction drawings. Depending on the foundation conditions, foundation improvements (e.g., deep soil mixing, soil columns) may be required prior to construction of the berm.

To construct the berm, clean structural fill or contaminated soil/media (provided the contaminated soil/media can be amended or manipulated to meet the parameters provided by a design engineer and can meet regulatory approval) shall be used in the reinforced portion of the berm. Suitable contaminated backfill material (as described above) is to be used in the non-reinforced portion of the berm. To facilitate uniform compaction of both the structural fill and the backfill material, the construction of the berm shall typically be carried out in the following steps:

1. Place and compact 1.5 foot thick (although thickness may vary based on the design parameters of the specific berm) lifts of structural fill as specified in the construction drawings with baskets on the face of the berm (or other acceptable wall facing material as specified).
2. Each basket shall have a welded wire form along the face of the berm to allow for top soil placement and facing construction.
3. A layer of 1.5 feet (although thickness may vary based on the design parameters of the specific berm) of structural fill shall be placed over a layer of geogrid (the geogrid is used as the reinforcing members).
4. A wrap geotextile is typically wrapped around the face to prevent topsoil from eroding before vegetation is established.
5. The structural fill shall extend from the wall facing to at least the specified length of the geogrid, from where it ties in to the existing surface on a 0-10:1 (horizontal:vertical) slope.
6. Typically, four 1.5 foot thick lifts shall be installed following steps 1-5. Depending on the configuration of the wall at a specific site, fewer lifts may be constructed at a given time but, typically, no more than four lifts will be constructed in one sequence.
7. Install the impermeable membrane (e.g., geomembrane) along the 0-10:1 (horizontal:vertical) slope to allow for separation between structural fill and CCB/contaminated media.
8. Place backfill material in 12 inch lifts to match the total thickness of the structural fill (typically 6 feet).
9. Weld the geomembrane, flip the geomembrane over the backfill material layer, and extend to the next structural fill/backfill material tie-in point.
10. Construct the next lifts of structural fill as outlined in steps 1-6.
11. Repeat the backfill material construction procedure outlined in Steps 7-9.
12. Repeat steps 10 and 11 until the berm is complete.

The construction of the berm of FIGS. 21-23 shall typically be carried out in the following steps:

1. Place and compact 1.5 foot thick (although thickness may vary based on the design parameters of the specified berm) lifts of structural fill as specified in the construction drawings with baskets on the face of the berm (or other acceptable wall facing material as specified).
2. Each lift shall have a welded wire form (basket) along the face of the berm to allow for top soil placement and facing construction.
3. Facing materials used in conjunction with the baskets shall be rolled out along the forms.
4. A layer of structural geogrid (reinforcing members) shall be placed up to the welded wire form. The layer of structural geogrid may be connected to the facing depending on the type of facing material used.
5. At a suitable distance from the wall face (typically 3-4 feet) a 2-foot wide sheet of impermeable geomembrane is welded longitudinally down the structural geogrid transverse bars to form a continuous joined seam on the top surface of the structural geogrid. Once welded in place the geomembrane will form a vertical hydraulic barrier that is substantially parallel with the face of the berm. Sections of structural geogrid can be joined on the landfill side of the geomembrane by appropriately designed and specified splicing method bars.
6. A 1.5-foot thick compacted layer of structural fill shall be placed over a layer of geogrid (the geogrid is used as the reinforcing members).
7. At a suitable distance from the wall face (typically 3-4 feet) a 2 feet width sheet of impermeable geomembrane is welded longitudinally down the structural geogrid transverse bars to form a continuous joined seam on the bottom surface of the structural geogrid. Sections of structural geogrid can be joined by appropriately designed and specified bodkin bars.
8. Topsoil shall be placed at the face of the berm and the wrap geotextile and/or erosion mat and biaxial geogrid are typically wrapped around the topsoil to prevent the face from eroding before vegetation is established.
9. The structural fill shall extend from the wall facing to at least the specified length of the geogrid, from where it ties in to the backslope which is a geomembrane lined slope.
10. Construct the next lift of structural fill as outlined in steps 1-9.11. Repeat step 10 until berm is complete.

Referring now to FIGS. 24-29, simplified cross-sectional diagrams of systems for strengthening a sloped structure, including but not limited to a sloped structure such as a berm, basin, levee, embankment, or the like (hereinafter referred to collectively as "containment structures") are illustrated in accordance with alternative embodiments of the present invention. FIGS. 24-29 each illustrate alternative systems for strengthening a sloped wall of a containment structure 920 that might contain, support, or hold back some material 922. For example, the containment structure might be a levee that contains water or a berm that contains trash (as in a landfill). Alternatively, the containment structure might be an embankment, such as a road embankment such that the road surface is supported on top of the embankment. Such containment structures may be constructed of a variety of different materials. A basic berm may be created simply by mounding soil. More complex berms may have a rock or gravel substrate, topped by clay and/or soil. It may be desirable to strengthen/buttress the sloped wall(s) of such a containment structure, especially if the failure/breaching of the containment structure may cause significant property damage, personal injury, or loss of life. It is desirable to have a system and method to strengthen/buttress the sloped wall(s) of such a containment structure without having to rebuild or significantly modify the containment structure itself. The slope strengthening system of embodiments of the invention may be constructed adjacent the existing sloped wall of a containment structure, or may be constructed after the sloped wall of the containment structure is "cut back" (i.e., some material is removed from the sloped wall; typically more material is removed from the bottom than from the top, thereby steepening the slope).

FIGS. 24-29 are cross-sectional views. It should be appreciated that the containment structures are generally elongated structures that typically span a significant distance (e.g., typically as little as hundreds of feet to as much as many miles). The strengthening system may adjoin its corresponding containment structure for much or all of that distance, or may adjoin its corresponding containment structure for only a small portion in situations in which only a small portion needs to be strengthened.

The systems for strengthening a sloped wall of a structure such as a berm, basin, levee, embankment, or the like of embodiments of the present invention generally comprise encapsulated fill material, with horizontal strengthening members disposed within the fill material, that is constructed in place against the sloped wall of the containment structure. FIGS. 24-27 illustrate embodiments in which the opposing sides of the strengthening system are generally parallel to each other, have generally the same slope as the sloped wall, and are generally about the same height as (or are somewhat shorter than) the containment structure. FIG. 28 illustrates an embodiment in which the opposing sides of the strengthening system are generally parallel to each other, have generally the same slope as the sloped wall, but are generally taller than the containment structure and has a portion that partially or fully covers the top of the containment structure. FIG. 29 illustrates an embodiment in which the opposing sides of the strengthening system have different slopes (such that the opposing sides meet at a peak) and are generally about the same height as (or are somewhat shorter than) the containment structure. The side of the strengthening system that adjoins the sloped wall of the containment structure will, of course, have generally the same slope as the sloped wall because of this adjoining relationship.

The strengthening system 930A of FIG. 24A comprises first 934 and second 946 opposing sides, with the second side being adjacent the sloped wall, a top side 931 adjoining top edges of the first and second sides, and a bottom side 941 adjoining bottom edges of the first and second sides, thereby forming a cavity within the first, second, top, and bottom sides. As mentioned above, the first and second sides are substantially parallel to each other in the embodiment of FIG. 24A. The strengthening system 930A further comprises fill material 936 disposed within the cavity. An impermeable membrane 932 encapsulates at least a portion of the fill material. The strengthening system 930A further comprises a plurality of reinforcing members 938 (typically horizontally) disposed within the fill material. The first side 934 has opposing inner and outer surfaces. The outer surface is commonly termed the "face" and the inner surface is adjacent the fill material. The system may optionally have facing material covering the face of the reinforced portion. The facing material, if present, is typically attached to or integral with the reinforcing members. The bottom side and at least a portion of the first and second sides may be positioned below grade 921 as illustrated. This below-grade placement of a portion of the strengthening system helps prevent any sliding motion of the bottom side away from the sloped structure which could weaken and perhaps cause the destruction of the strengthening system. This below-grade placement is an optional feature of all embodiments of the invention.

The reinforcing members are typically disposed within the cavity in a substantially horizontal arrangement, and extend from the first side toward the second side. The reinforcing members are typically comprised of geogrid. The strengthening system of embodiments of the invention will typically comprise at least one or two layers of geogrid, but the number of layers will generally depend on the steepness, width, and depth of the strengthening system.

The fill material may comprise structural fill material or contaminated fill material. The fill material may comprise structural fill, that typically comprises relatively homogeneous soils that are relatively free of debris, foreign objects, excess silt, roots, and organics. The contaminated fill material can be any suitable waste product that has the desired coarseness, shear strength, high friction angle, and high bearing capacity. The contaminated fill material should be non-hazardous, but is nonetheless expensive to properly dispose of. The contaminated fill material may comprise FFCPs, non-hazardous contaminated soils, contaminated crushed glass, contaminated crushed concrete, contaminated crushed asphalt, sand blast grit, foundry sands, properly de-watered dredge spoils, and combinations of these materials. Importantly, the fill material is fully encapsulated or at least partially encapsulated by an impermeable membrane 932.

The impermeable membrane is, when intact, impermeable to fluids and/or gases. The impermeable membrane used in embodiments of the invention may comprise, for example, a geomembrane, a compacted low permeability clay liner, a geosynthetic clay liner (GCL), geomembrane laminated Geosynthetic Clay Liner, etc., or liner systems that will typically conform to Subtitle D of the Resource Conservation and Recovery Act (RCRA), conform to an approved equivalent of Subtitle D of RCRA (described in further detail below), or conform to a liner and/or cover system requirement of any appropriate regulatory agency. The geomembrane may comprise one of low-density polyethylene (LDPE), high-density polyethylene (HDPE), polyvinyl chloride (PVC), polyurea or polypropylene (PP). Because of the potentially large size of such a berm and the limited size of commercially available geomembranes, the impermeable membrane may comprise a plurality of impermeable membrane sections joined with impermeable seams. The plurality of impermeable membrane sections are typically joined using any desirable method of joining such material, including but not limited to extrusion welding, solvent welding, fusion welding, and/or gluing (especially for PVC or PP).

Similarly as described above in relation to FIGS. 21-23, the reinforcing members extend from and are typically attached to or integral with the wall-facing material, and as such, the impermeable membrane cannot simply be placed substantially vertically adjacent the first side, as the reinforcing members obstruct an uninterrupted placement of the membrane. Therefore, the portion of the membrane adjacent the first side may comprise multiple segments that each span from one reinforcing member to an adjacent reinforcing member, as described in detail above. The impermeable membrane thereby at least partially encapsulates at least a portion of one or more reinforcing members.

The strengthening system 930A of FIG. 24A may comprise a drainage system within the impermeable membrane, the drainage system comprising a perforated pipe 944 surrounded by a granular fill material 942. Similarly as described above in relation to other figures, an optional plurality of drainage pipes (not illustrated) may each lead substantially perpendicularly from the perforated pipe to an area outside of the cavity. The drainage pipes may either lead toward the first side and exit the cavity through the first side, or may lead toward the content 922 and exit the cavity into the content. The drainage pipes may ultimately lead to a collection tank for later management or may (where the strengthening system is used to strengthen a landfill wall) discharge into the landfill's leachate collection and treatment system. Each of the plurality of drainage pipes typically pass through the impermeable membrane via a corresponding boot that is joined to the impermeable membrane and to the corresponding drainage pipe with impermeable seams. The strengthening system 930A of FIG. 24 may have a foundation of granular fill material 940.

FIG. 24B illustrates a strengthening system 930B which is nearly identical to strengthening system 930A of FIG. 25A, but strengthening system 930B of FIG. 24B comprises a somewhat different drainage system. As illustrated in FIG. 24B, the drainage system comprises a perforated pipe 944 surrounded by a granular fill material 942. However, the granular fill material 942 of strengthening system 930B extends from the first side to the second side rather than just being positioned in a corner of the cavity (this is an optional feature of all embodiments of the invention). FIG. 24B shows the perforated pipe 944 being closer to the first side, but the perforated pipe could be positioned at any suitable location within the granular fill material. Additionally, multiple perforated pipes could be used. As mentioned above, an optional plurality of drainage pipes (not illustrated) may each lead substantially perpendicularly from the perforated pipe to an area outside of the cavity. FIG. 24B also illustrates that a perforated pipe 945 may be placed within the foundation of granular fill material 940 (this is an optional feature of all embodiments of the invention).

FIG. 24C illustrates a strengthening system 930C which is nearly identical to strengthening system 930B of FIG. 24B, but in the strengthening system 930C of FIG. 24C, the bottom side comprises a downwardly extending keyed portion 943 that fits within a corresponding depression in the surface beneath the bottom side (this keyed portion is an optional feature of all embodiments of the invention). This keyed portion helps prevent any sliding motion of the bottom side away from the sloped structure which could weaken and perhaps cause the destruction of the strengthening system (thereby providing further prevention of sliding motion in addition to the below-grade placement of the bottom portion of the strengthening system). The keyed portion may be more useful on relatively wider strengthening systems (i.e., strengthening systems in which the distance between the first and second sides is relatively greater). As in the strengthening system 930B of FIG. 24B, the strengthening system 930C of FIG. 24C may comprise a perforated pipe 945 placed within the foundation of granular fill material 940. In such an optional embodiment, the perforated pipe 945 may be placed in the portion of the foundation that corresponds to the keyed portion, as this is the lowest portion and would thereby better facilitate drainage.

FIGS. 25-27 illustrate alternative embodiments of a strengthening system of embodiments of the invention. The embodiments of FIGS. 25-27 are similar to that of FIGS. 24A-C. However, the embodiments of FIGS. 25-27 further comprise a drainage layer to facilitate the flow of any liquid within the cavity toward the drainage system. Such a drainage layer may be placed (i) adjacent an inner surface of the impermeable membrane and adjacent a portion of the impermeable membrane that is adjacent the second side; (ii) adjacent an inner surface of the impermeable membrane and adjacent a portion of the impermeable membrane that is adjacent the bottom side; (iii) adjacent the sloped wall and adjacent an outer surface of the impermeable membrane; and/or (iv) adjacent the bottom side and adjacent an outer surface of the impermeable membrane. More specifically, FIG. 25 illustrates alternative strengthening system 960 in which the drainage layer 948 is outside of the impermeable membrane and along both the second side and the bottom side. FIG. 26 illustrates alternative strengthening system 970 in which the drainage layer 950 is inside the impermeable membrane and along both the second side and the bottom side. FIG. 27 illustrates alternative strengthening system 974 in which the drainage layer 948 is outside of the impermeable membrane and along both the second side and the bottom side and in which the drainage layer 950 is inside the impermeable membrane and along both the second side and the bottom side. While FIGS. 25-27 all illustrate a drainage layer along both the second and bottom sides, the drainage layers may be located along only the second side or along only the bottom side of any of these embodiments. The drainage layer may comprise a geosynthetic drainage media or a granular material. The granular material is typically well graded sand, well graded sand and gravel, crushed stone, or other approved granular material.

FIG. 28 illustrates a further alternative embodiment of a strengthening system 980 of embodiments of the invention. The embodiment of FIG. 28 is similar to that of FIG. 24. However, in the embodiment of FIG. 28, the fill material extends over the top edge of the second side 946, over the top edge of the sloped wall, and over the top of the containment structure 920. This extension of the fill material may help further strengthen the containment structure. This extension of the fill material may be encapsulated by the impermeable membrane as illustrated. A drainage layer may be located between the top of the containment structure and the extension of the fill material. This drainage layer may be adjacent an outer surface of the impermeable membrane (as illustrated by element 948 of FIG. 28), adjacent an inner surface of the impermeable membrane, or both.

FIG. 29 illustrates a further alternative embodiment of a strengthening system 984 of embodiments of the invention. The embodiment of FIG. 29 is similar to that of FIG. 24. However, in the embodiment of FIG. 29, the slope of the first side 950 is greater than a slope of the second side 946 such that top edges of the first and second sides adjoin. As such, the cross-sectional shape of the strengthening system 984 of FIG. 29 is an obtuse triangle. While FIG. 29 illustrates a drainage layer 948 adjacent an outer surface of the impermeable membrane, the embodiment of FIG. 29 may instead or additionally comprise a drainage layer adjacent an inner surface of the impermeable membrane.

To construct the slope strengthening system, contaminated soil/media (it may be desirable for the contaminated soil/media to be amended or manipulated to meet the parameters provided by a design engineer and can meet regulatory approval) shall typically be used as the fill material. To facilitate uniform compaction of the fill material, the construction of the slope strengthening system of FIGS. 24-29 shall typically be carried out in the following steps (if typical mechanically stabilized earthen wall construction with wire baskets is utilized) (wire baskets are typically not used if the slope of the face is greater than about 1.5:1):

1. Place and compact 1.5 foot thick (although thickness may vary based on the design parameters of the specified berm) lifts of fill material as specified in the construction drawings with baskets on the face of the berm (or other acceptable wall facing material as specified). The first lift may be a granular drainage layer or geosynthetic equivalent as specified by the design engineer.

2. Each lift shall have a welded wire form (basket) along the face of the berm to allow for top soil placement and facing construction.

3. Facing materials used in conjunction with the baskets shall be rolled out along the forms.

4. A layer of structural geogrid (as reinforcing members) shall be placed up to the welded wire form. The geogrid may be connected to the facing depending on the type of facing material used.

5. At a suitable distance from the wall face (typically 3-4 feet) a 2-foot wide sheet (or greater as specified) of impermeable geomembrane is welded longitudinally down the structural geogrid transverse bars to form a continuous joined seam on the top surface of the structural geogrid. Once welded in place, the geomembrane will form a vertical hydraulic barrier that is parallel with the face of the slope strengthening system. Sections of structural geogrid can be joined on the containment structure side of the geomembrane by appropriately designed, specified, and placed bodkin bars.

6. A 1.5-foot thick compacted layer of fill material shall be placed over a layer of geogrid (the geogrid is used as the reinforcing members). Additional compacted layers of fill material shall be placed over previous layers if required and specified.

7. Topsoil shall be placed at the face of the slope strengthening system and the wrap geotextile and/or erosion mat and biaxial geogrid are typically wrapped around the topsoil to prevent the face from eroding before vegetation is established.

8. At a suitable distance from the wall face (typically 3-4 feet) a two feet width sheet of impermeable geomembrane (or greater if specified) is welded longitudinally down the structural geogrid transverse bars to form a continuous joined seam on the bottom surface of the structural geogrid. Sections of structural geogrid can be joined by appropriately designed and specified bodkin bars.

9. The fill material placed in Step 6 shall extend from the impermeable geomembrane to at least the specified length of the geogrid, from where it extends to the backslope which is a geomembrane lined slope.

10. Construct the next lift of fill material as outlined in steps 1-9.

11. Repeat the construction procedure outlined in Steps 10.

12. Repeat steps 10 and 11 until the berm is complete.

The construction of the slope strengthening system of FIGS. 24-29 shall typically be carried out in the following steps (if no typical wire basket wall facing utilized):

1. Place and compact 1.5 feet thick (although thickness may vary based on the design parameters of the specified berm) lifts of fill material as specified in the construction drawings. The first lift may be a granular drainage layer or geosynthetic equivalent as specified by the design engineer.

2. A layer of structural geogrid (reinforcing members) shall be placed up to the exterior edge with a transverse bar as the outside edge. It may be connected to the facing depending on the type of facing material if used.

3. The required width sheet of impermeable geomembrane is welded longitudinally down the structural geogrid transverse bars to form a continuous joined seam on the top surface of the structural geogrid. Once welded in place the geomembrane will form a vertical hydraulic barrier that is parallel with the face of the slope strengthening system. Sections of structural geogrid can be joined on the landfill side of the geomembrane by appropriately designed and specified bodkin bars if needed.

4. A 1.5-foot thick compacted layer of fill material shall be placed over a layer of geogrid (the geogrid is used as the reinforcing members). Additional compacted layers of structural fill shall be placed over previous layers as required and specified.

5. The previously installed and welded impermeable geomembrane is welded longitudinally down the structural geogrid transverse bars to form a continuous joined seam on the bottom surface of the structural geogrid. Sections of structural geogrid can be joined by appropriately designed and specified bodkin bars if required.

6. Topsoil shall be placed at the face of the berm and the wrap geotextile and/or erosion mat and biaxial geogrid are typically wrapped around the topsoil to prevent the face from eroding before vegetation is established.

7. The fill material shall extend from the wall facing to at least the specified length of the geogrid, from where it ties in to the backslope which is a geomembrane lined slope.

8. Construct the next lift of fill material as outlined in steps 1-7.

9. Repeat the backfill material construction procedure outlined in Steps 8.

10. Repeat steps 8 and 9 until the slope strengthening system is complete.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for strengthening a sloped structure, the system comprising:
   first and second opposing sides, the second side adapted to be adjacent the sloped structure;
   a bottom side adjoining bottom edges of the first and second sides, thereby forming a cavity within the first, second, and bottom sides;
   fill material disposed within the cavity;
   an impermeable membrane fully encapsulating at least a portion of the fill material, the impermeable membrane being impermeable to fluids;
   a plurality of reinforcing members disposed within the fill material, the plurality of reinforcing members extending from the first side toward the second side; and
   a drainage system within the impermeable membrane;
   wherein each of one or more of the plurality of reinforcing members is partially within the impermeable membrane and partially outside the impermeable membrane.

2. The system of claim 1, wherein the first and second sides are substantially parallel to each other.

3. The system of claim 2, further comprising a top side adjoining top edges of the first and second sides, such that the cavity is formed within the first, second, top, and bottom sides.

4. The system of claim 2, wherein the fill material extends over a top edge of the second side and is adapted to extend over a top of the sloped structure.

5. The system of claim 1, wherein a slope of the first side is greater than a slope of the second side such that top edges of the first and second sides adjoin.

6. The system of claim 1, wherein the plurality of reinforcing members are disposed within the cavity in a substantially horizontal arrangement.

7. The system of claim 1, wherein the fill material comprises contaminated fill material; wherein the contaminated fill material comprises one or more of fossil fuel combustion product, fly ash, bottom ash, boiler slag, flue gas desulphurization material, nonhazardous contaminated soil, contaminated crushed glass, contaminated crushed concrete, contaminated crushed asphalt, sand blast grit, foundry sand, properly de-watered dredge spoils, or combinations thereof; and wherein the contaminated fill material is contaminated with one or more of a metal, an acid, a base, a volatile organic compound, a semi-volatile organic compound, a petroleum product, selenium, mercury, lead, boron, cadmium, thallium, a polycyclic aromatic hydrocarbons compound, or combinations thereof.

8. The system of claim 1, wherein the impermeable membrane comprises a geomembrane.

9. The system of claim 8, wherein the geomembrane comprises one of low-density polyethylene (LDPE), high-density polyethylene (HDPE), polyvinyl chloride (PVC), polyurea or polypropylene (PP).

10. The system of claim 1, wherein the impermeable membrane comprises a plurality of impermeable membrane sections joined with impermeable seams.

11. The system of claim 10, wherein the plurality of impermeable membrane sections are joined using gluing, extrusion welding, solvent welding, or fusion welding.

12. The system of claim 10, wherein one or more impermeable membrane sections are joined to respective ones of the plurality of reinforcing members adjacent opposing sides of the impermeable membrane sections.

13. The system of claim 10, wherein at least one impermeable membrane section is joined to an adjacent one of the plurality of reinforcing members above the at least one impermeable membrane section and an adjacent one of the plurality of reinforcing members below the at least one impermeable membrane section.

14. The system of claim 1, wherein the drainage system comprises a perforated pipe surrounded by a granular fill material.

15. The system of claim 14, wherein the drainage system further comprises at least one drainage pipe leading from the perforated pipe to an area outside of the cavity; wherein the at least one drainage pipe exits the impermeable membrane through a corresponding boot that is joined to the impermeable membrane and to the corresponding drainage pipe with impermeable seams.

16. The system of claim 1, further comprising:
a drainage layer that is (i) adjacent an inner surface of the impermeable membrane adjacent a portion of the impermeable membrane that is adjacent the second side; (ii) adjacent an inner surface of the impermeable membrane adjacent a portion of the impermeable membrane that is adjacent the bottom side; (iii) adapted to be adjacent the sloped structure and adjacent an outer surface of the impermeable membrane; and/or (iv) adjacent the bottom side and adjacent an outer surface of the impermeable membrane.

17. The system of claim 16, wherein the drainage layer comprises a geosynthetic drainage media or a granular material.

18. The system of claim 1, wherein the bottom side and at least a portion of the first and second sides are adapted to be below grade of a surface upon which the sloped structure sits.

19. The system of claim 1, wherein the bottom side comprises a downwardly extending keyed portion that fits within a corresponding depression in a surface beneath the bottom side.

* * * * *